United States Patent
Anegawa et al.

(10) Patent No.: US 12,240,159 B2
(45) Date of Patent: Mar. 4, 2025

(54) INJECTION MOLDING MACHINE AND METHOD OF CONTROLLING INJECTION MOLDING MACHINE

(71) Applicant: SEIKO EPSON CORPORATION, Tokyo (JP)

(72) Inventors: Kenta Anegawa, Matsumoto (JP); Kei Yokota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 4 days.

(21) Appl. No.: 17/130,888

(22) Filed: Dec. 22, 2020

(65) Prior Publication Data

US 2021/0197434 A1 Jul. 1, 2021

(30) Foreign Application Priority Data

Dec. 26, 2019 (JP) .............................. JP2019-236188

(51) Int. Cl.
*B29C 45/76* (2006.01)
*B29C 45/46* (2006.01)
(Continued)

(52) U.S. Cl.
CPC ............ *B29C 45/461* (2013.01); *B29C 45/54* (2013.01); *B29C 45/60* (2013.01); *B29C 45/62* (2013.01);
(Continued)

(58) Field of Classification Search
CPC ....... B29C 45/53; B29C 45/533; B29C 45/54; B29C 45/60; B29C 45/62; B29C 45/76;
(Continued)

(56) References Cited

U.S. PATENT DOCUMENTS 3,248,755 A * 5/1966 Plymale .................. B29C 48/47
264/211.1
3,355,764 A * 12/1967 Moyer .................... B29C 48/47
425/381.2
(Continued)

FOREIGN PATENT DOCUMENTS

CN 101502992 A 8/2009
JP H06166072 * 6/1994 ........... B29C 45/586
(Continued)

OTHER PUBLICATIONS

Office Action for CN Patent Application No. CN202011539745.7, dated Aug. 2, 2022, 18 pages of Office Action.
(Continued)

*Primary Examiner* — Thu-Khanh T. Nguyen
(74) *Attorney, Agent, or Firm* — CHIP LAW GROUP

(57) ABSTRACT

To provide an injection molding machine which includes: a melting unit including a screw rotating about a rotation axis and having a groove forming surface on which a groove is formed and a barrel provided with a communication hole in a facing surface facing the groove forming surface, and configured to plasticize a material to generate a plasticized material and make the plasticized material flow out of the communication hole; a heating unit configured to heat the melting unit; an injection nozzle in communication with the communication hole and configured to inject the plasticized material into a mold; an injection control unit including a cylinder coupled to the communication hole and a plunger; a pressure detection unit configured to detect a pressure of the plasticized material flowing into the communication hole; and a control unit. The control unit controls the injection control unit to execute, based on a detected value, at least one of a metering operation of metering the plasticized material in the communication hole in the cylinder, (Continued)

and an injecting operation of injecting the plasticized material in the cylinder into the mold via the injection nozzle.

13 Claims, 14 Drawing Sheets

(51) Int. Cl.
*B29C 45/54* (2006.01)
*B29C 45/60* (2006.01)
*B29C 45/62* (2006.01)
*B29C 45/74* (2006.01)
*B29C 45/77* (2006.01)
*B29C 45/80* (2006.01)

(52) U.S. Cl.
CPC .............. *B29C 45/74* (2013.01); *B29C 45/77* (2013.01); *B29C 45/80* (2013.01)

(58) Field of Classification Search
CPC ....... B29C 45/77; B29C 45/776; B29C 48/47; B29C 48/475
See application file for complete search history.

(56) References Cited

U.S. PATENT DOCUMENTS

| | | | | |
|---|---|---|---|---|
| 6,146,575 A | * | 11/2000 | Huston | ................ F04C 13/002 425/270 |
| 7,520,739 B2 | * | 4/2009 | Takeuchi | ................ B29C 45/53 425/140 |
| 7,914,271 B2 | * | 3/2011 | Plumpton | ........... B29C 45/2711 425/549 |
| 8,425,217 B2 | * | 4/2013 | Groleau | ................. B29C 45/77 425/149 |
| 11,407,157 B2 | * | 8/2022 | Hakoda | ................. B29C 45/766 |
| 11,426,933 B2 | * | 8/2022 | Anegawa | .............. B29C 64/165 |
| 2007/0184146 A1 | | 8/2007 | Takeuchi | |
| 2015/0097309 A1 | * | 4/2015 | Newman | ................. B29C 45/14 264/40.7 |
| 2019/0061243 A1 | * | 2/2019 | Saito | ....................... B29C 64/35 |
| 2020/0094480 A1 | * | 3/2020 | Yamasaki | .............. B29C 48/47 |

FOREIGN PATENT DOCUMENTS

| | | |
|---|---|---|
| JP | H06198689 A | 7/1994 |
| JP | H08290448 A | 11/1996 |
| JP | 2000167896 A | 6/2000 |
| JP | 2005306028 A | 11/2005 |
| JP | 2010000752 A | 1/2010 |
| JP | 2010241016 A | 10/2010 |

OTHER PUBLICATIONS

Office Action for JP Patent Application No. JP2019236188, issued on Sep. 26, 2023, 9 pages of Office Action.

\* cited by examiner

INJECTION MOLDING MACHINE AND METHOD OF CONTROLLING INJECTION MOLDING MACHINE

The present application is based on, and claims priority from JP Application Serial Number 2019-236188, filed Dec. 26, 2019, the disclosure of which is hereby incorporated by reference herein in its entirety.

BACKGROUND

1. Technical Field

The present disclosure relates to an injection molding machine and a method of controlling an injection molding machine.

2. Related Art

JP-A-2010-241016 discloses an injection molding machine in which a resin is plasticized by a plasticizing and delivering device, and the plasticized resin is metered and injected into a mold by a metering and injecting device including a plunger. The plasticizing and delivering device provided in the injection molding machine includes a rotor having a helical groove and a barrel that has a communication hole at a center and is in contact with an end surface of the rotor.

In the plasticizing and delivering device described above, since the resin is plasticized while being conveyed from an outer peripheral portion of the rotor to a center portion in the end surface of the rotor, when a balance between the conveyance and the plasticization is lost due to a temperature change or the like, a plasticized state of the resin or an amount of the plasticized resin may change. At this time, for example, when the plunger is operated at a constant speed at the time of metering, mixing of air into the metering and injecting device, or excessive supply of the resin may occur, which may affect a shaping quality. In addition, when the plunger is operated at a constant speed at the time of injection, variation in a pressure of the resin injected into the mold may cause insufficient filling of the resin into the mold, an increase in an internal stress of a shaped object, and the like, which may affect a molding quality.

SUMMARY

According to a first aspect of the present disclosure, an injection molding machine is provided. The injection molding machine includes: a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole; a heating unit configured to heat the melting unit; an injection nozzle in communication with the communication hole; an injection control unit including a cylinder coupled to the communication hole and a plunger configured to move in the cylinder; a pressure detection unit configured to detect a pressure of the plasticized material in the communication hole; and a control unit. The control unit controls the injection control unit to execute, based on a detected value detected by the pressure detection unit, at least one of a metering operation of metering the plasticized material in the communication hole in the cylinder by moving the plunger in a direction away from the communication hole, and an injecting operation of injecting the plasticized material in the cylinder into a mold via the injection nozzle by moving the plunger in a direction approaching the communication hole.

According to a second aspect of the present disclosure, an injection molding machine is provided. The injection molding machine includes: a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole; a supply flow path in communication with the communication hole; a heating unit configured to heat the melting unit; an injection nozzle in communication with the supply flow path; an injection control unit including a cylinder coupled to the supply flow path and a plunger configured to move in the cylinder; a pressure detection unit configured to detect a pressure of the plasticized material in the supply flow path; and a control unit. The control unit controls the injection control unit to execute, based on a detected value detected by the pressure detection unit, at least one of a metering operation of metering the plasticized material in the supply flow path in the cylinder by moving the plunger in a direction away from the supply flow path, and an injecting operation of injecting the plasticized material in the cylinder into a mold via the injection nozzle by moving the plunger in a direction approaching the supply flow path.

According to a third aspect of the present disclosure, a method of controlling an injection molding machine is provided. In the method of controlling an injection molding machine, the injection molding machine includes: a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole; a heating unit configured to heat the melting unit; an injection nozzle in communication with the communication hole; and an injection control unit including a cylinder coupled to the communication hole and a plunger configured to move in the cylinder. The method of controlling an injection molding machine includes: detecting a pressure of the plasticized material in the communication hole; and controlling the injection control unit to execute, based on a detected value of the detected pressure, at least one of a metering operation of metering the plasticized material in the communication hole in the cylinder by moving the plunger in a direction away from the communication hole, and an injecting operation of injecting the plasticized material in the cylinder via the injection nozzle by moving the plunger in a direction approaching the communication hole.

DESCRIPTION OF EXEMPLARY EMBODIMENTS

A. First Embodiment

Figure 1:
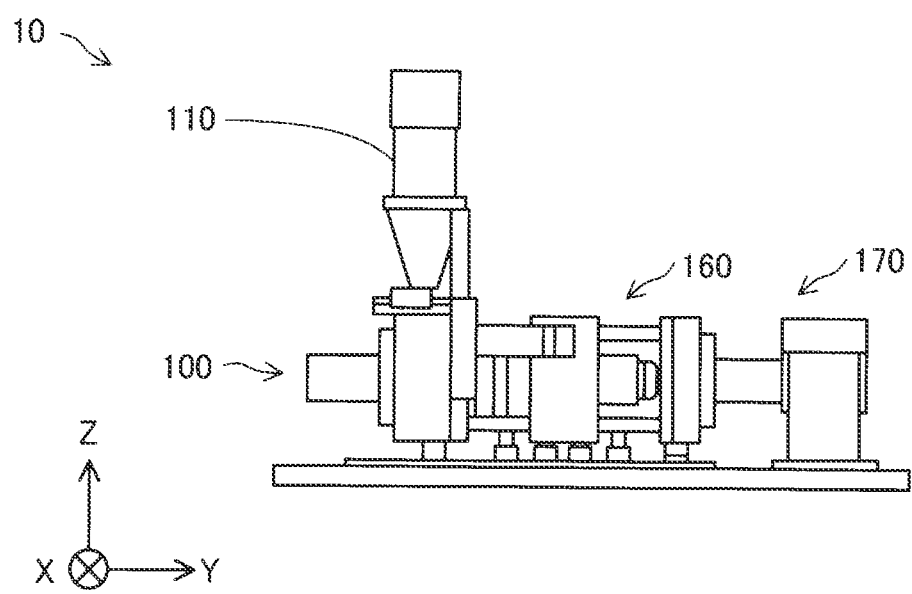
FIG. 1 is a first diagram showing a schematic configuration of an injection molding machine according to a first embodiment.

FIG. 1 is a first diagram showing a schematic configuration of an injection molding machine 10 according to the present embodiment. FIG. 1 shows arrows along X, Y, and Z directions orthogonal to each other. The X, Y, and Z directions are directions along three spatial axes that are orthogonal to each other, that is, an X axis, a Y axis, and a Z axis, and include both one direction along the X axis, the Y axis, and the Z axis and an opposite direction. The X axis and the Y axis are axes along a horizontal plane, and the Z axis is an axis along a vertical line. In other figures, the arrows along the X, Y, and Z directions are appropriately shown. The X, Y, Z directions in FIG. 1 and the X, Y, Z directions in other figures represent the same direction.

The injection molding machine 10 includes an injection unit 100, a material supply unit 110, a mold unit 160, and a mold clamping device 170. The injection molding machine 10 uses the injection unit 100 to plasticize a material supplied from the material supply unit 110 to generate a plasticized material, and to inject the plasticized material into the mold unit 160 to mold a molded object.

Figure 2:
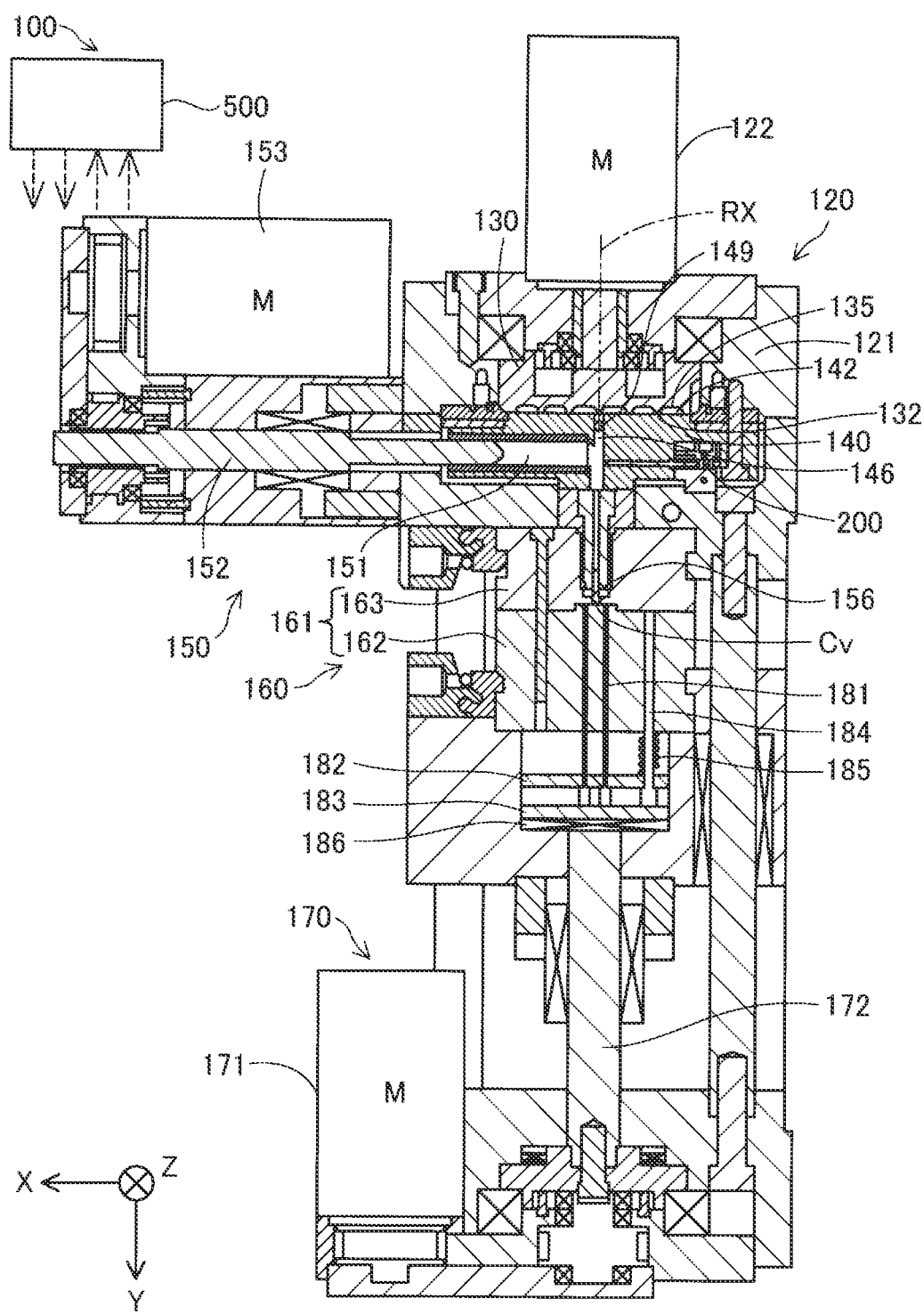
FIG. 2 is a second diagram showing the schematic configuration of the injection molding machine according to the first embodiment.

FIG. 2 is a second diagram showing the schematic configuration of the injection molding machine 10. FIG. 2 shows the injection unit 100, the mold unit 160, and the mold clamping device 170 of the injection molding machine 10. The injection unit 100 includes a melting unit 120, an injection control unit 150, an injection nozzle 156, a pressure detection unit 200, and a control unit 500.

The material supply unit 110 shown in FIG. 1 communicates with the melting unit 120 shown in FIG. 2. The material supply unit 110 supplies the material to the melting unit 120 of the injection unit 100. In the present embodiment, the material supply unit 110 is implemented by a hopper. The material in a state of pellets, powder, or the like is accommodated in the material supply unit 110. In the present embodiment, as the material, an ABS resin formed in a pellet shape is stored in the material supply unit 110.

The melting unit 120 includes a screw case 121, a drive motor 122, a screw 130, a barrel 140, a heating unit 148, and a check valve 149. The melting unit 120 plasticizes at least a part of the material supplied from the material supply unit 110, and generates a plasticized material in a paste form having fluidity, and then guides the plasticized material to the injection control unit 150. The term "plasticize" means that a material having thermoplasticity is softened by being heated to a temperature equal to or higher than a glass transition point, and exhibits fluidity. The term "melt" means not only that the material having thermoplasticity is heated to a temperature equal to or higher than a melting point to become a liquid, but also the material having thermoplasticity is plasticized. The screw 130 of the present embodiment is sometimes referred to as a "flat screw" or a "scroll".

The screw 130 has a substantially columnar shape whose height in a direction along a central axis RX thereof is smaller than a diameter. The screw 130 is accommodated in a space surrounded by the screw case 121 and the barrel 140. The screw 130 has a groove forming surface 132 in which a groove portion 135 is provided on a surface facing the barrel 140. Specifically, the groove forming surface 132 of the screw 130 faces a facing surface 142 of the barrel 140. The drive motor 122 is coupled to a surface of the screw 130 opposite to the groove forming surface 132. The screw 130 rotates about the central axis RX by torque generated by the drive motor 122. The drive motor 122 is driven under the control of the control unit 500. The central axis RX may be referred to as a rotation axis of the screw 130.

Figure 3:
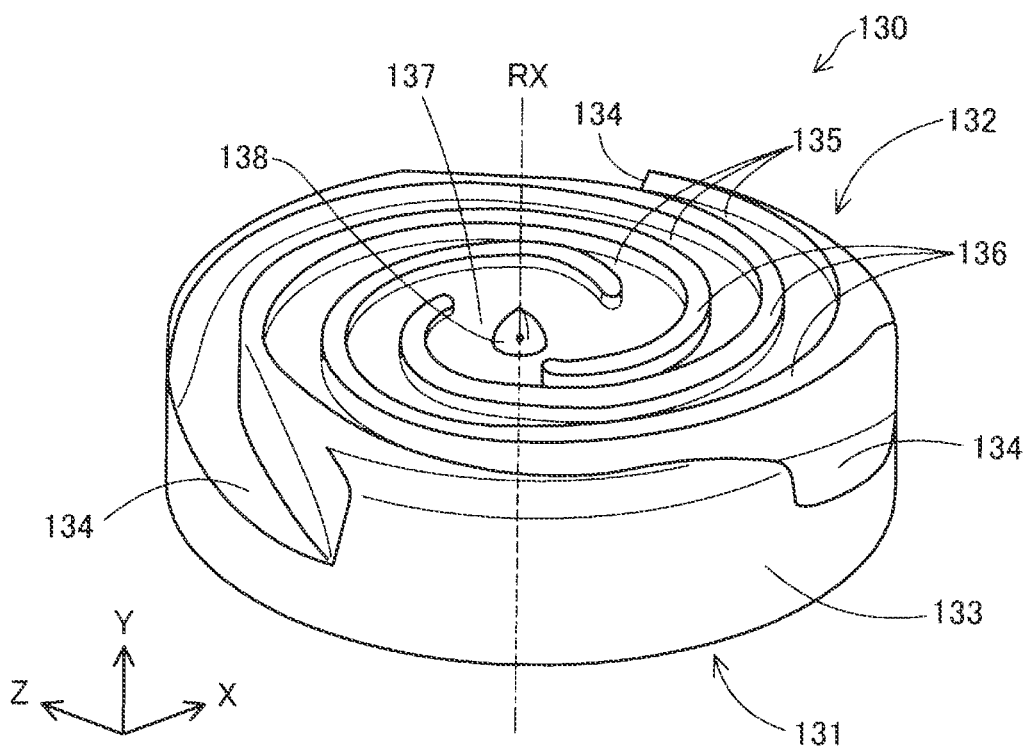
FIG. 3 is a perspective view showing a configuration of a screw on a groove forming surface side.

FIG. 3 is a perspective view showing a configuration of the screw 130 on a groove forming surface 132 side. In FIG. 3, a position of the central axis RX of the screw 130 is shown by a chain line. As described above, the groove portion 135 is provided in the groove forming surface 132.

The groove portion 135 of the screw 130 constitutes a so-called scroll groove. The groove portion 135 extends from a central portion 137 toward an outer periphery of the screw 130 in a form of swirl so as to draw an arc. The groove portion 135 may be configured to extend in an involute curve shape or a spiral shape. The groove forming surface 132 is provided with ridge portions 136 that form side wall portions of respective groove portions 135 and extend along the respective groove portions 135. The groove portion 135 is continuous with a material introduction port 134 formed in a side surface 133 of the screw 130. The material introduction port 134 is a portion for receiving the material in the groove portion 135. The material supplied from the material supply unit 110 is supplied between the screw 130 and the barrel 140 via the material introduction port 134.

The central portion 137 of the groove forming surface 132 of the screw 130 is implemented as a recess to which one end of the groove portion 135 is coupled. As shown in FIG. 2, the central portion 137 faces a communication hole 146 provided in the facing surface 142 of the barrel 140. The central portion 137 intersects the central axis RX.

The screw 130 of the present embodiment includes a retention reducing portion 138 protruding toward the communication hole 146 in the central portion 137. In the present embodiment, the retention reducing portion 138 has a substantially conical shape, and a central axis of the retention reducing portion 138 substantially coincides with the central axis RX of the screw 130. A tip end of the retention reducing portion 138 is disposed inside the communication hole 146 rather than an opening end of the communication hole 146 of the facing surface 142. Since the plasticized material in the central portion 137 is efficiently guided to the communication hole 146 by the retention reducing portion 138, retention of the plasticized material is prevented. The retention of the plasticized material may also be referred to as "stagnation".

FIG. 3 shows an example of the screw 130 having three groove portions 135 and three ridge portions 136. The number of the groove portions 135 or the ridge portions 136 provided on the screw 130 is not limited to three. The screw 130 may be provided with only one groove portion 135, or may be provided with two or more groove portions 135. Any number of the ridge portions 136 may be provided in accordance with the number of the groove portions 135.

FIG. 3 illustrates an example of the screw 130 in which material introduction ports 134 are formed at three places. The number of the material introduction ports 134 provided in the screw 130 is not limited to three. In the screw 130, the material introduction port 134 may be provided at only one place, or may be provided at two or more places.

Figure 4:
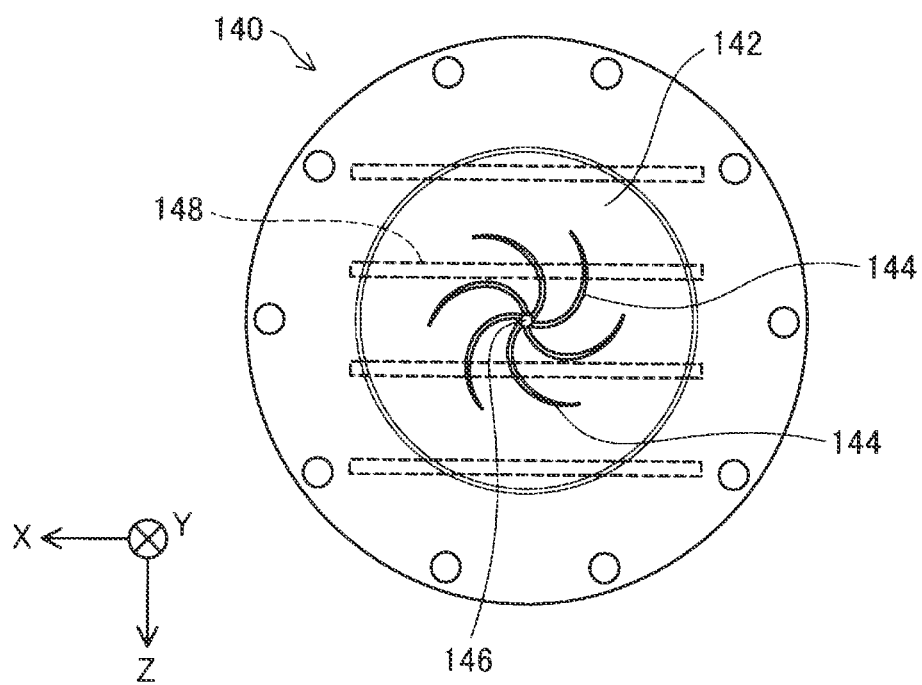
FIG. 4 is a diagram showing a configuration of a barrel on a facing surface side.

FIG. 4 is a diagram showing a configuration of the barrel 140 on a facing surface 142 side. As described above, the barrel 140 has the facing surface 142 facing the groove forming surface 132 of the screw 130. The communication hole 146 in communication with the injection nozzle 156 is provided at a center of the facing surface 142. A plurality of guide grooves 144 are provided around the communication hole 146 in the facing surface 142. One end of the guide groove 144 is coupled to the communication hole 146, and extends in a form of swirl from the communication hole 146 toward an outer periphery of the facing surface 142. The guide groove 144 has a function of guiding a shaping material to the communication hole 146. In order to make the shaping material efficiently reach the communication hole 146, the guide groove 144 is preferably formed in the barrel 140, but the guide groove 144 may not be formed in the barrel 140.

The heating unit 148 heats the melting unit 120. In the present embodiment, the heating unit 148 is implemented by four heaters provided in the barrel 140. Output of the heating unit 148 is controlled by the control unit 500.

The check valve 149 is provided in the communication hole 146. The check valve 149 prevents backflow of the plasticized material from the communication hole 146 to the central portion 137 and the groove portion 135 of the screw 130.

The melting unit 120 heats the material supplied between the screw 130 and the barrel 140 by the screw 130, the barrel 140, and the heating unit 148 while conveying the material toward the communication hole 146 to generate a plasticized material, and causes the plasticized material to flow out from the communication hole 146 to the injection control unit 150.

As shown in FIG. 2, the injection control unit 150 includes a cylinder 151, a plunger 152, and a plunger drive unit 153. The cylinder 151 is a substantially cylindrical member coupled to the communication hole 146 of the barrel 140. The plunger 152 moves inside the cylinder 151. The plunger 152 is driven by the plunger drive unit 153 implemented by a motor, a gear, or the like. The plunger drive unit 153 is controlled by the control unit 500.

The injection control unit 150 executes a metering operation and an injecting operation by sliding the plunger 152 in the cylinder 151 under the control of the control unit 500. The metering operation refers to an operation of guiding the plasticized material in the communication hole 146 into the cylinder 151 and metering the plasticized material in the cylinder 151 by moving the plunger 152 in a −X direction away from the communication hole 146. The injecting operation refers to an operation of injecting the plasticized material in the cylinder 151 into a mold via the injection nozzle 156 by moving the plunger 152 in a +X direction approaching the communication hole 146. Moving the plunger 152 in a direction away from the communication hole 146 may be referred to as pulling the plunger 152. In addition, moving the plunger 152 in a direction approaching the communication hole 146 may be referred to as pushing the plunger 152.

As described above, the injection nozzle 156 communicates with the communication hole 146. When the above metering operation and injecting operation are executed, the plasticized material metered in the cylinder 151 is sent from the injection control unit 150 to the injection nozzle 156 via the communication hole 146, and is then injected from the injection nozzle 156 to the mold unit 160.

The mold unit 160 includes a mold 161. The plasticized material sent to the injection nozzle 156 is injected from the injection nozzle 156 into a cavity Cv of the mold 161. Specifically, the mold 161 has a movable mold 162 and a fixed mold 163 that face each other, and has the cavity Cv formed therebetween. The cavity Cv is a space corresponding to a shape of the molded object. In the present embodiment, the movable mold 162 and the fixed mold 163 are made of a metal material. The movable mold 162 and the fixed mold 163 may be formed of a ceramic material or a resin material.

The mold clamping device 170 includes a mold drive unit 171 and a ball screw unit 172. The mold drive unit 171 is implemented by a motor, a gear, or the like, and is coupled to the movable mold 162 via the ball screw unit 172. Driving of the mold drive unit 171 is controlled by the control unit 500. The ball screw unit 172 transfers power generated by the driving of the mold drive unit 171 to the movable mold 162. The mold clamping device 170 opens and closes the mold unit 160 by moving the movable mold 162 by the mold drive unit 171 and the ball screw unit 172 under the control of the control unit 500.

Figure 5:
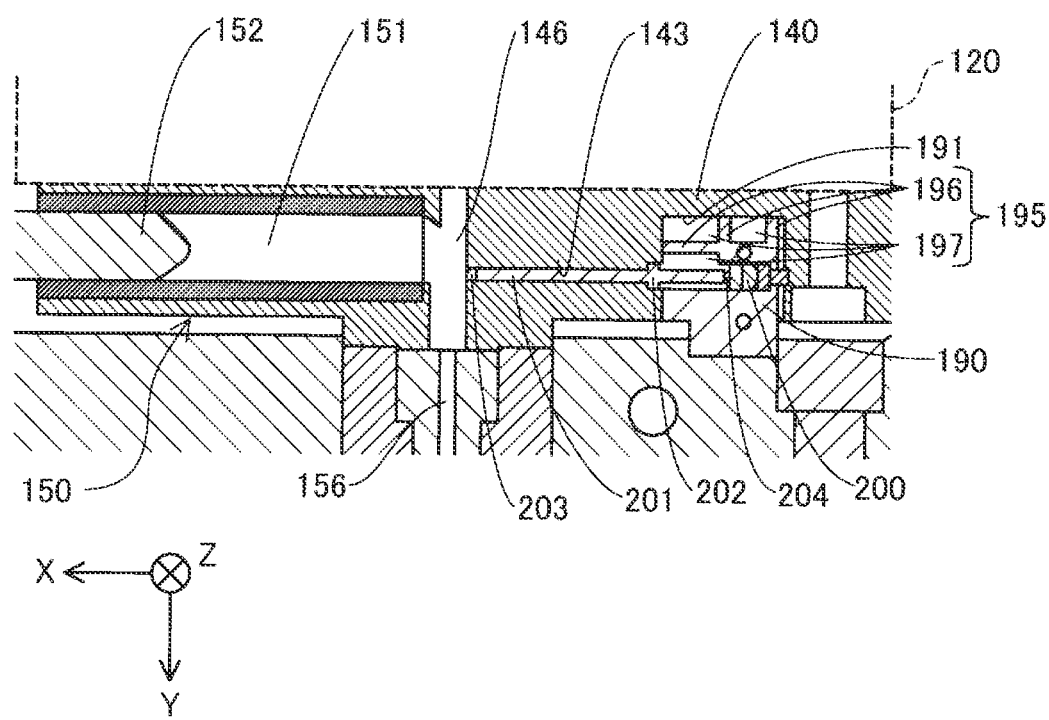
FIG. 5 is a diagram showing a schematic configuration of a pressure detection unit.

FIG. 5 is a diagram showing a schematic configuration of the pressure detection unit 200. The pressure detection unit 200 detects a pressure of the plasticized material in the communication hole 146. In the present embodiment, the pressure detection unit 200 is supported by a support unit 190. The support unit 190 and the pressure detection unit 200 are disposed in a concave portion 191 provided in a lower portion of the barrel 140.

The support unit 190 is fixed to the barrel 140 via bolts (not shown). The support unit 190 includes a heat reducing unit 195. The heat reducing unit 195 reduces heat conduction from the melting unit 120 to the pressure detection unit 200, and the heat reducing unit 195 is provided between the pressure detection unit 200 and the melting unit 120. The heat reducing unit 195 includes a plurality of leg portions 196. A plurality of spaces 197 are formed between the melting unit 120 and the support unit 190 by the plurality of leg portions 196. Due to air in the space 197, the heat conduction from the melting unit 120 to the pressure detection unit 200 is reduced. In another embodiment, the heat reducing unit 195 may be formed of, for example, a heat insulating material such as glass wool.

The pressure detection unit 200 according to the present embodiment detects a pressure of the plasticized material in the communication hole 146 via a rod 201. The rod 201 is an axial member including a flange portion 202. The rod 201 is disposed in a through hole 143 provided in the barrel 140 along the X direction. The through hole 143 is provided along the X direction, and allows the communication hole 146 and the concave portion 191 to communicate with each other via the through hole 143. A tip end portion 203, which is one end of the rod 201, is disposed so as to face an inside of the communication hole 146. A rear end portion 204, which is the other end of the rod 201, is provided to face the pressure detection unit 200 in the concave portion 191. The flange portion 202 is formed in the middle of the rod 201 in the X direction. The flange portion 202 is disposed in the −X direction of the through hole 143 so as to restrict a movement of the rod 201 in the +X direction.

The rod 201 receives a pressure from the plasticized material in the communication hole 146 by the tip end portion 203, and transfers the received pressure to the pressure detection unit 200 by the rear end portion 204. The pressure detection unit 200 detects the pressure transferred from the rod 201.

The pressure detection unit 200 according to the present embodiment detects the pressure of the plasticized material in the communication hole 146 downstream of a coupling portion between the cylinder 151 and the communication hole 146. Specifically, the pressure detection unit 200 detects the pressure of the plasticized material in the communication hole 146 via the rod 201 disposed downstream of the coupling portion between the cylinder 151 and the communication hole 146.

The pressure detection unit 200 according to the present embodiment is implemented by a pressure sensor having quartz. The pressure detection unit 200 uses a piezoelectric effect of the quartz to detect, as an electrical signal, the pressure received by the pressure detection unit 200. The pressure detection unit 200 is controlled by the control unit 500 via a wiring (not shown), and sends a detected value of the detected pressure as an electric signal to the control unit 500. The pressure detection unit 200 may be implemented by, for example, a pressure sensor having another piezoelectric element, or may be implemented by a capacitance pressure sensor.

Figure 6:
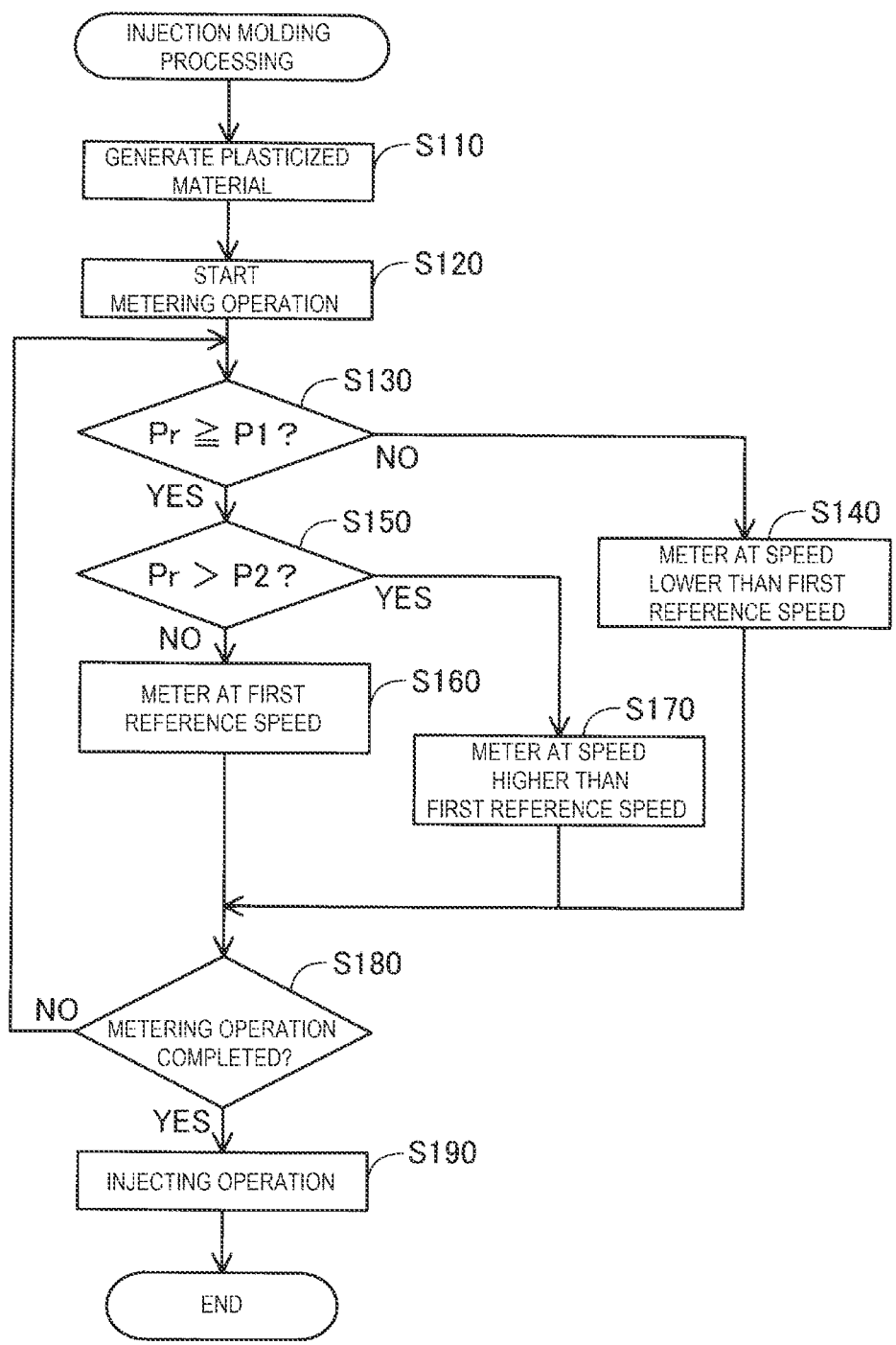
FIG. 6 is a flowchart showing an injection molding processing according to the first embodiment.

FIG. 6 is a flowchart showing an injection molding processing according to the present embodiment. It can be said that FIG. 6 shows an example of a method of controlling the injection molding machine 10. The control unit 500 executes the injection molding processing by controlling the above described injection unit 100 and mold clamping device 170. In the present embodiment, the pressure detection unit 200 continuously detects the pressure of the plasticized material in the communication hole 146 and continuously sends the detected value to the control unit 500 in the entire process of the injection molding processing shown in FIG. 6.

In step S110, the control unit 500 controls the melting unit 120 to plasticize the material supplied from the material supply unit 110 to generate a plasticized material.

In step S120, the control unit 500 controls the plunger drive unit 153 to start the metering operation. In the present embodiment, the control unit 500 executes the metering operation based on the detected value detected by the pressure detection unit 200, as shown after step S130. Specifically, the control unit 500 adjusts a pulling speed of the plunger 152 based on the detected value.

Figure 7:
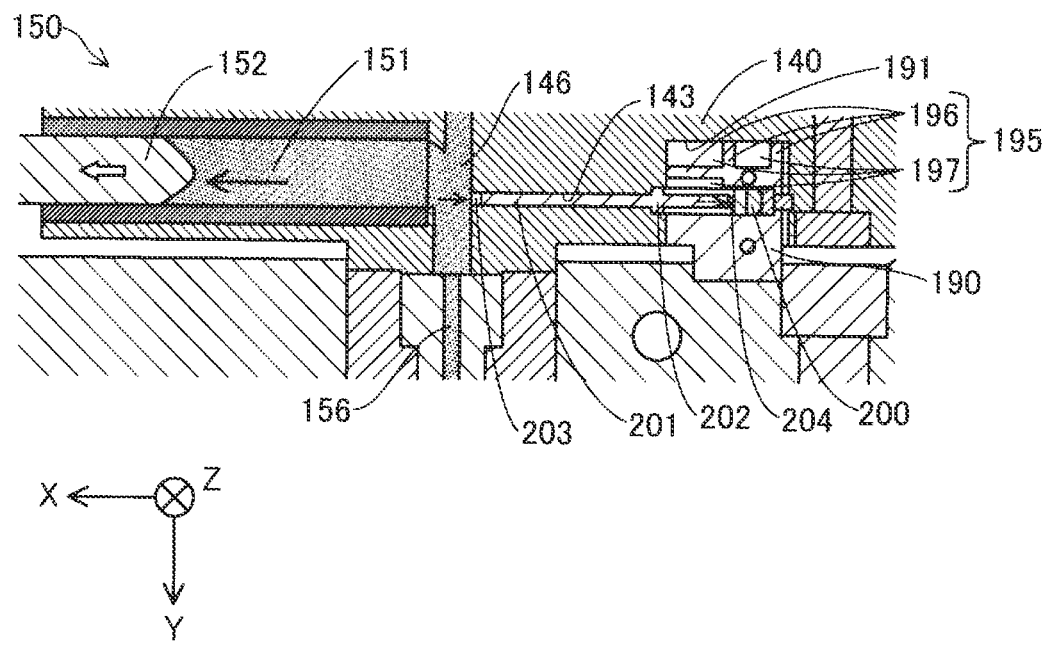
FIG. 7 is a diagram showing a metering operation according to the first embodiment.

FIG. 7 is a diagram showing the metering operation according to the present embodiment. In the metering operation, when the plunger 152 is pulled, the inside of the communication hole 146 is filled with the plasticized material, and the plasticized material is guided into the cylinder 151. The pressure detection unit 200 detects the pressure of the plasticized material in the communication hole 146 during the metering operation. In FIG. 7, a flow of the plasticized material in the metering operation is indicated by a solid line and arrow. The pressure of the plasticized material in the communication hole 146, which is transferred to the pressure detection unit 200 via the rod 201, is indicated by a broken line and arrow.

Figure 8:
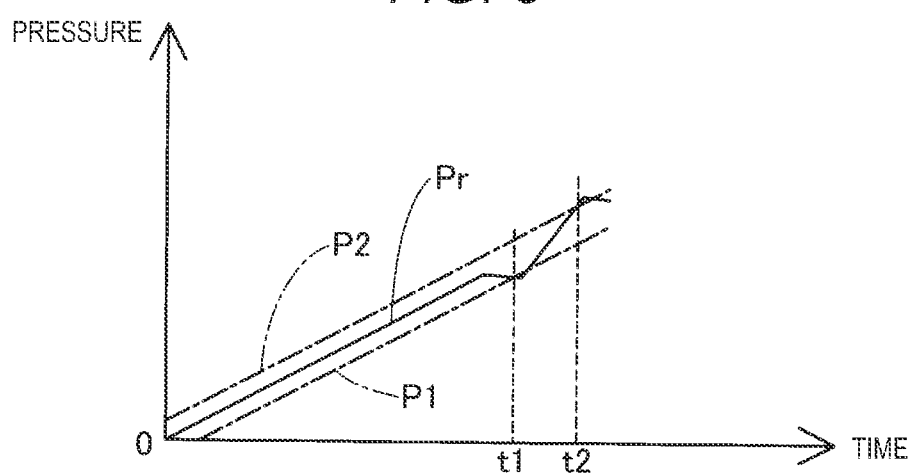
FIG. 8 is a graph showing an example of a pressure change of a plasticized material during the metering operation.

FIG. 8 is a graph showing an example of a pressure change of the plasticized material during the metering operation. In FIG. 8, a detected value Pr with respect to a time t detected continuously by the pressure detection unit 200 during the metering operation is indicated by a solid line. A first reference value P1 and a second reference value P2 with respect to the time t are indicated by chain lines. The second reference value P2 is a value larger than the first reference value P1. The first reference value P1 and the second reference value P2 are determined in advance, for example, as values for implementing an amount of the plasticized material for molding the molded object with high accuracy.

In step S130 of FIG. 6, the control unit 500 determines whether the detected value Pr is equal to or greater than the first reference value P1. When it is determined in step S130 that the detected value Pr is not equal to or greater than the first reference value P1, the control unit 500 pulls the plunger 152 at a speed lower than a first reference speed in step S140. That is, in the metering operation, when the detected value Pr is less than the first reference value P1, the control unit 500 pulls the plunger 152 at a speed lower than the first reference speed. The first reference speed is determined in advance, for example, as a speed at which the detected value Pr is equal to or greater than the first reference value P1 and equal to or less than the second reference value P2 when the plasticized material is ideally supplied from the melting unit 120.

As shown in FIG. 8, at a time t1, the detected value Pr is less than the first reference value P1. At the time t1, when the plunger 152 is pulled at the first reference speed, for example, air may be mixed into the cylinder 151. At the time t1, by pulling the plunger 152 at a speed lower than the first reference speed, the control unit 500 prevents the mixing of air and thus improves metering accuracy of the plasticized material.

When it is determined in step S130 of FIG. 6 that the detected value Pr is equal to or greater than the first reference value P1, in step S150, the control unit 500 determines whether the detected value Pr is larger than the second reference value P2. When it is determined in step S150 that the detected value Pr is not larger than the second reference value P2, in step S160, the control unit 500 pulls the plunger 152 at the first reference speed. That is, in the metering operation, when the detected value Pr is equal to or greater than the first reference value P1 and equal to or less than the second reference value P2, the control unit 500 pulls the plunger 152 at the first reference speed.

When it is determined in step S150 that the detected value Pr is larger than the second reference value P2, in step S170, the control unit 500 pulls the plunger 152 at a speed higher than the first reference speed. That is, in the metering operation, when the detected value Pr is greater than the second reference value P2, the control unit 500 pulls the plunger 152 at a speed higher than the first reference speed.

As shown in FIG. 8, at a time t2, the detected value Pr is greater than the second reference value P2. At this time, when the plunger 152 is pulled at the first reference speed, the amount of the plasticized material introduced into the cylinder 151 is larger than that of a case where the detected value Pr is a value equal to or greater than the first reference value P1 and equal to or less than the second reference value P2. The control unit 500 can prevent an excessive supply of the plasticized material into the cylinder 151 by pulling the plunger 152 at a speed higher than the second reference speed at the time t2. A change in the detected value Pr at the time t1 or the time t2 is caused by, for example, a change in the amount or state of the plasticized material generated by the melting unit 120. The change occurs due to, for example, a temperature change of the melting unit 120.

In step S180, the control unit 500 determines whether the metering operation is completed. When it is determined in step S180 that the metering operation is not completed, the control unit 500 returns the processing to step S130 to continue the injection molding processing. For example, when metering of the plasticized material required for molding from a position of the plunger 152 or the like is completed, the control unit 500 determines that the metering operation is completed.

When it is determined in step S180 that the metering operation is completed, in step S190, the control unit 500 controls the plunger drive unit 153 to execute the injecting operation. The plasticized material in the cylinder 151 metered in step S130 is injected into the cavity Cv of the mold unit 160 via the injection nozzle 156 by the injecting operation in step S190. The injecting operation may include a pressure-holding operation for holding a pressure of the plasticized material in the cavity Cv.

According to the injection molding machine 10 of the present embodiment described above, the control unit 500 controls, based on the detected value Pr detected by the pressure detection unit 200, the injection control unit 150 to execute the metering operation. Accordingly, even when the amount or state of the plasticized material generated by the melting unit 120 is changed, the metering accuracy is kept high. Therefore, injection accuracy of the plasticized material is improved, and molding accuracy of a molded product is improved.

In the present embodiment, the pulling speed of the plunger 152 is adjusted based on the detected value Pr in the metering operation. Therefore, the metering accuracy of the plasticized material is kept high, and the injection accuracy of the plasticized material is improved.

According to the present embodiment, in the metering operation, the control unit 500 pulls the plunger 152 at the first reference speed when the detected value Pr is equal to or greater than the first reference value P1 and equal to or less than the second reference value P2, pulls the plunger 152 at a speed lower than the first reference speed when the detected value Pr is less than the first reference value P1, and pulls the plunger 152 at a speed higher than the first reference speed when the detected value Pr exceeds the second reference value P2. Therefore, the metering accuracy of the plasticized material is kept high, and the plasticized material is efficiently metered.

In the present embodiment, the heat reducing unit 195 is provided between the pressure detection unit 200 and the melting unit 120. Therefore, deterioration of the pressure detection unit 200 due to heat transfer from the melting unit is prevented, and a degree of freedom of an arrangement place of the pressure detection unit 200 is increased.

In the present embodiment, the pressure detection unit 200 detects the pressure of the plasticized material in the communication hole 146 downstream of a coupling portion between the cylinder 151 and the communication hole 146. Accordingly, the injection control unit 150 is controlled based on the detected value of the pressure of the plasticized material at a position closer to the injection nozzle 156 in the metering operation. Therefore, the amount of the injected plasticized material is more stable, and the injection accuracy is improved.

In the present embodiment, the screw 130 includes a retention reducing portion protruding toward the communication hole 146 in the central portion 137 of the groove forming surface 132. Accordingly, the retention of the plasticized material in the central portion 137 is reduced. Therefore, the amount or state of the plasticized material sent from the melting unit 120 to the injection nozzle 156 via the communication hole 146 is stabilized, and the injection accuracy of the plasticized material is improved.

In the metering operation, as long as a processing is executed in which the control unit 500 pulls the plunger 152 at the first reference speed when the detected value Pr is equal to or greater than the first reference value P1 and equal to or less than the second reference value P2, pulls the plunger 152 at a speed lower than the first reference speed when the detected value Pr is less than the first reference value P1, and pulls the plunger 152 at a speed higher than the first reference speed when the detected value Pr exceeds the second reference value P2, a processing different from the injection molding processing shown in FIG. 6 may be executed.

B. Second Embodiment

Figure 9:
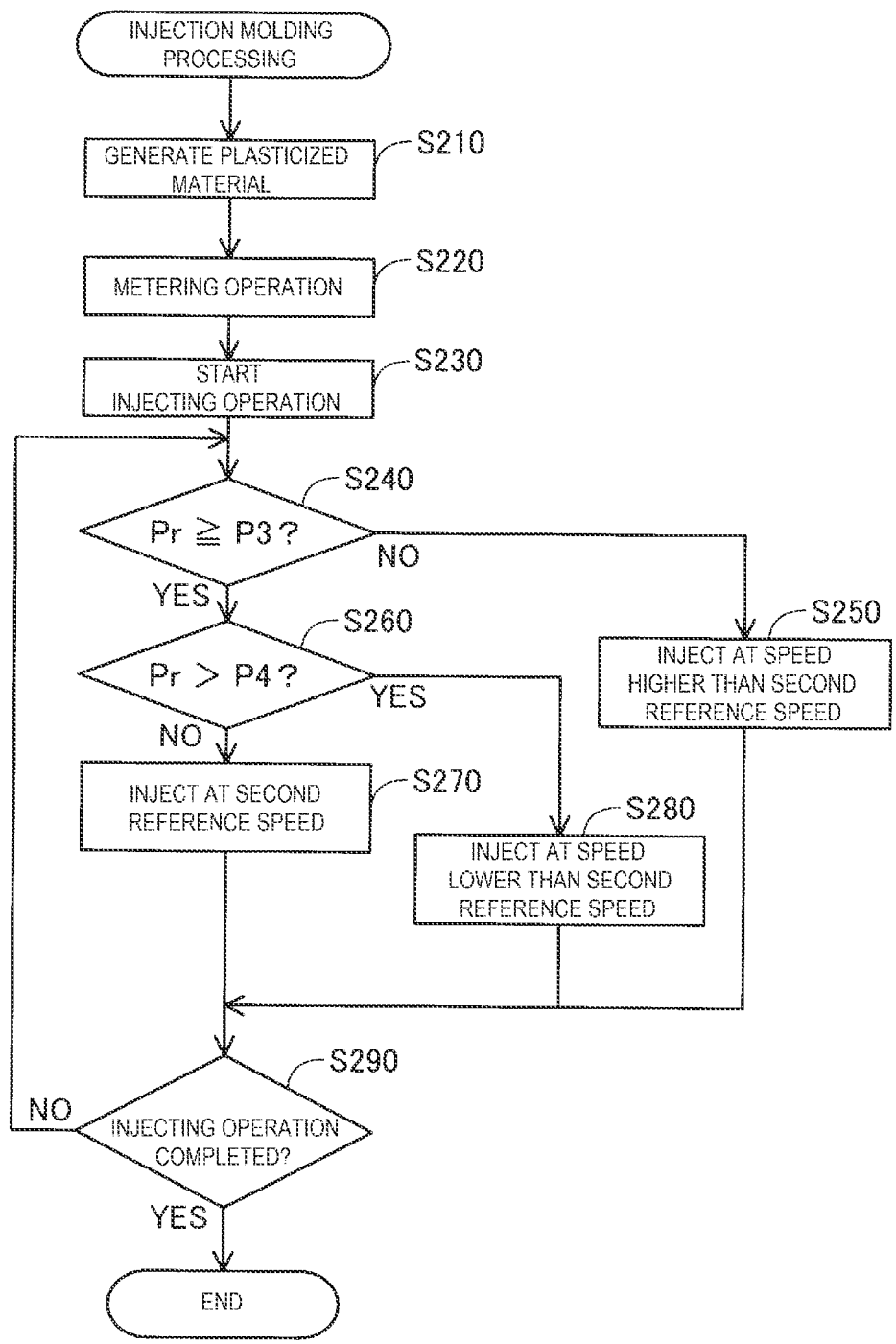
FIG. 9 is a flowchart showing an injection molding processing according to a second embodiment.

FIG. 9 is a flowchart showing an injection molding processing according to a second embodiment. It can be said that FIG. 9 shows an example of a method of controlling the injection molding machine 10 according to the second embodiment. In the injection molding processing according to the second embodiment, unlike the first embodiment, the metering operation is executed independently of the detected value Pr, and the injecting operation is executed based on the detected value Pr. Since the configuration of the injection molding machine 10 of the second embodiment is similar to that of the first embodiment, a description thereof is omitted.

Since step S210 is similar to step S110 of the first embodiment shown in FIG. 6, and a description thereof is omitted.

In step S220, the control unit 500 controls the plunger drive unit 153 to execute the metering operation. In the present embodiment, the control unit 500 executes the metering operation independently of the detected value Pr of the pressure detection unit 200.

In step S230, the control unit 500 controls the plunger drive unit 153 to start the injecting operation. In the present embodiment, the control unit 500 executes the injecting operation based on the detected value detected by the pressure detection unit 200. Specifically, the control unit 500 pushes the plunger 152 based on the detected value.

Figure 10:
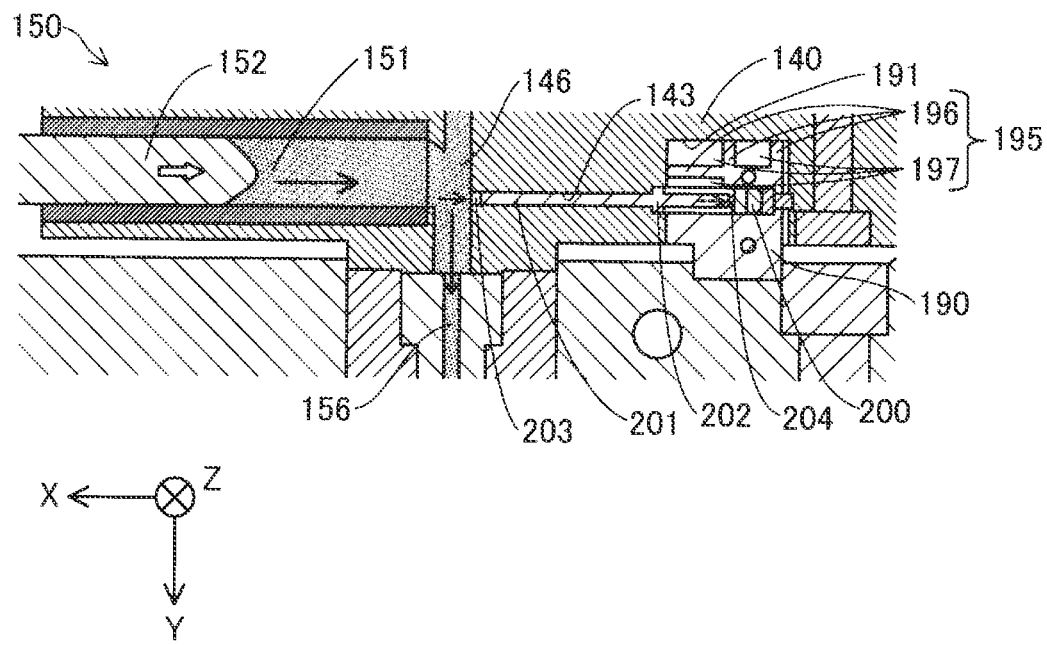
FIG. 10 is a diagram showing an injecting operation according to the second embodiment.

FIG. 10 is a diagram showing the injecting operation according to the present embodiment. In the injecting operation, when the plunger 152 is pushed, the plasticized material in the cylinder 151 metered by the metering operation in step S220 is sent to the injection nozzle 156 via the communication hole 146, and the plasticized material is injected into the cavity Cv of the mold unit 160 via the injection nozzle 156. The pressure detection unit 200 detects the pressure of the plasticized material in the communication hole 146 during the injecting operation. In FIG. 10, the flow of the plasticized material in the injecting operation is indicated by a solid line and arrow. The pressure of the plasticized material in the communication hole 146, which is transferred to the pressure detection unit 200 via the rod 201, is indicated by a broken line and arrow.

Figure 11:
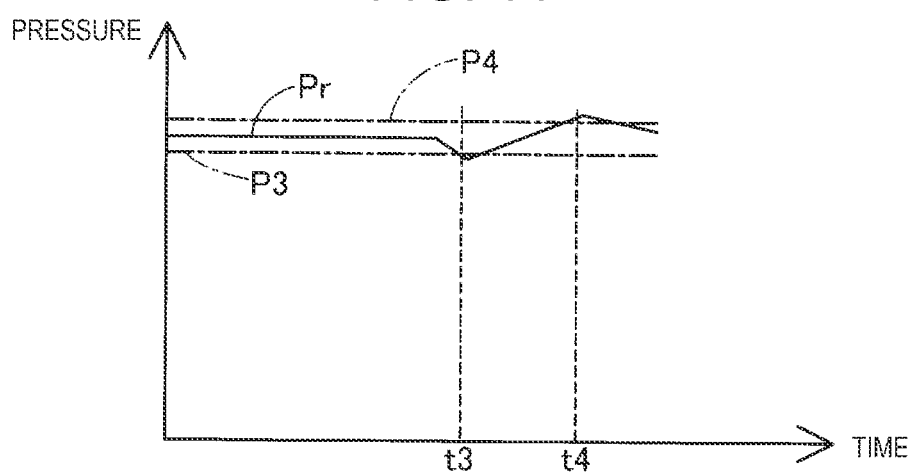
FIG. 11 is a graph showing an example of a pressure change of the plasticized material during the injecting operation.

FIG. 11 is a graph showing an example of a pressure change of the plasticized material during the injecting operation. In FIG. 11, the detected value Pr with respect to the time t is indicated by a solid line. A third reference value P3 and a fourth reference value P4 with respect to the time t are indicated by chain lines. The fourth reference value P4 is a value larger than the third reference value P3. The third reference value P3 and the fourth reference value P4 are determined in advance, for example, as pressure values for molding the molded object with high accuracy.

In step S240 of FIG. 9, the control unit 500 determines whether the detected value Pr is equal to or greater than the third reference value P3. When it is determined in step S240 that the detected value Pr is not equal to or greater than the third reference value P3, in step S250, the control unit 500 pushes the plunger 152 at a speed higher than a second reference speed. That is, in the injecting operation, when the detected value Pr is less than the third reference value P3, the control unit 500 pushes the plunger 152 at a speed higher than the second reference speed. The second reference speed is determined in advance, for example, as a speed at which the detected value Pr is equal to or greater than the third reference value P3 and equal to or less than the fourth reference value P4 when the plasticized material is ideally supplied from the melting unit 120 and the plasticized material is ideally metered in the injection control unit 150.

As shown in FIG. 11, at a time t3, the detected value Pr is less than the third reference value P3. At the time t3, when the plunger 152 is pushed at the second reference speed, the amount of the plasticized material injected into the mold unit 160 via the injection nozzle 156 is smaller than that of a case where the detected value Pr is equal to or greater than the third reference value P3 and equal to or less than the fourth reference value P4. At the time t3, by pushing the plunger 152 at a speed higher than the second reference speed, the control unit 500 can prevent an insufficiency of an injection amount of the plasticized material injected into the mold unit 160. The insufficiency of the injection amount of the plasticized material may be referred to as insufficient filling.

When it is determined in step S240 of FIG. 9 that the detected value Pr is equal to or greater than the third reference value P3, in step S260, the control unit 500 determines whether the detected value Pr is larger than the fourth reference value P4. When it is determined in step S260 that the detected value Pr is not larger than the fourth reference value P4, in step S270, the control unit 500 pushes the plunger 152 at the second reference speed. That is, in the injecting operation, when the detected value Pr is equal to or greater than the third reference value P3 and equal to or less than the fourth reference value P4, the control unit 500 pushes the plunger 152 at the second reference speed.

When it is determined in step S260 that the detected value Pr is larger than the fourth reference value P4, in step S280, the control unit 500 pushes the plunger 152 at a speed lower than the second reference speed. That is, in the injecting operation, when the detected value Pr is greater than the fourth reference value P4, the control unit 500 pushes the plunger 152 at a speed lower than the second reference speed.

As shown in FIG. 11, at a time t4, the detected value Pr is greater than the fourth reference value P4. At this time, when the plunger 152 is pushed at the second reference speed, the plasticized material is injected into the mold unit 160 at a pressure greater than that of a case where the detected value Pr is equal to or greater than the third reference value P3 and equal to or less than the fourth reference value P4. When the plasticized material is injected into the mold unit 160 at a pressure greater than a proper pressure, stress may remain in the molded object and strength of the molded object may decrease. At the time t4, by pushing the plunger 152 at a speed lower than the second reference speed, the control unit 500 can prevent the shaping material from being injected to the mold unit 160 at an excessive pressure. The stress remaining in the molded object may be referred to as residual stress. A change in the detected value Pr at the time t3 or the time t4 is caused by, for example, a change in the amount or state of the plasticized material flowing out from the melting unit 120 to the communication hole 146. The detected value Pr may vary depending on a shape of the cavity Cv of the mold unit 160. For example, when the plasticized material injected into the mold unit 160 passes through a portion of the cavity Cv having a small flow path cross-sectional area, the detected value Pr is larger than that of a case where the plasticized material passes through a portion of the cavity Cv having a large flow path cross-sectional area.

In step S290, the control unit 500 determines whether the injecting operation is completed. When it is determined in step S290 that the injecting operation is not completed, the control unit 500 returns the processing to step S240 to continue the injection molding processing. When it is determined in step S290 that the injecting operation is completed, the control unit 500 ends the injection molding processing.

According to the injection molding machine 10 of the present embodiment described above, the control unit 500 controls, based on the detected value Pr detected by the pressure detection unit 200, the injection control unit 150 to execute the injecting operation. Accordingly, even when the amount or state of the plasticized material generated by the melting unit 120 is changed, the injection accuracy of the plasticized material is kept high. Therefore, the molding accuracy of the molded product is improved.

In the present embodiment, a pushing speed of the plunger 152 is adjusted based on the detected value Pr in the injecting operation. Therefore, the injection accuracy of the plasticized material is kept high, and the molding accuracy of the molded product is improved.

According to the present embodiment, in the injecting operation, the control unit 500 pushes the plunger 152 at the second reference speed when the detected value Pr is equal to or greater than the third reference value P3 and equal to or less than the fourth reference value P4, pushes the plunger 152 at a speed higher than the second reference speed when the detected value Pr is less than the third reference value P3, and pushes the plunger 152 at a speed lower than the second reference speed when the detected value Pr is greater than the fourth reference value P4. Therefore, the injection accuracy of the plasticized material is kept high, and the molded product is efficiently molded.

In the present embodiment, similar to the first embodiment, the pressure detection unit 200 detects the pressure of the plasticized material in the communication hole 146 downstream of the coupling portion between the cylinder 151 and the communication hole 146. Accordingly, the injection control unit 150 is controlled based on the detected value of the pressure of the plasticized material at a position closer to the injection nozzle 156 in the injecting operation. Therefore, the pressure of the injected plasticized material is more stable and the injection accuracy is improved.

In the injecting operation, as long as a processing is executed in which the control unit 500 pushes the plunger 152 at the second reference speed when the detected value Pr is equal to or greater than the third reference value P3 and equal to or less than the fourth reference value P4, pushes the plunger 152 at a speed higher than the second reference speed when the detected value Pr is less than the third reference value P3, and pushes the plunger 152 at a speed lower than the second reference speed when the detected value Pr is greater than the fourth reference value P4, a processing different from the injection molding processing shown in FIG. 9 may be executed. Further, the injecting operation may include a pressure-holding operation.

C. Third Embodiment

Figure 12:
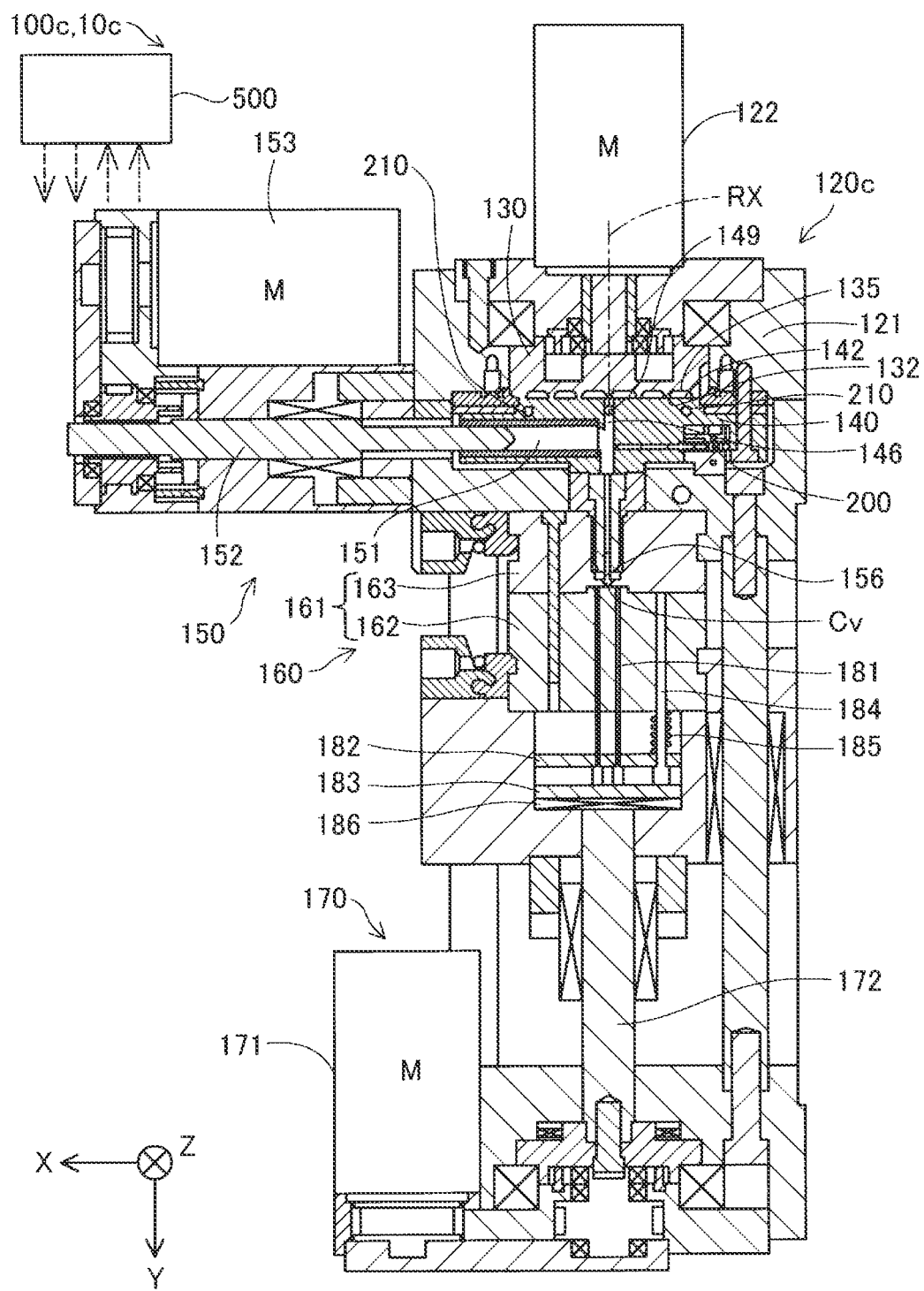
FIG. 12 is a diagram showing a schematic configuration of an injection molding machine according to a third embodiment.

FIG. 12 is a diagram showing a schematic configuration of an injection molding machine 10c according to a third embodiment. In the present embodiment, a configuration of a melting unit 120c of an injection unit 100c is different from that of the first embodiment. Points of the injection unit 100c that are not particularly described are similar to those of the first embodiment.

The melting unit 120c of the present embodiment includes a cooling unit 210. The cooling unit 210 cools a region of the melting unit 120c closer to an outer peripheral portion of the barrel 140 than the communication hole 146. Further, the cooling unit 210 cools the pressure detection unit 200. The cooling unit 210 of the present embodiment is implemented by an annular refrigerant flow path along a circumferential direction of the barrel 140. The cooling unit 210 takes in a refrigerant from a refrigerant inlet port (not shown) to the refrigerant flow path, and discharges the refrigerant to the outside through a refrigerant discharge port (not shown). In the present embodiment, a part of the refrigerant flow path forming the cooling unit 210 is positioned in a vicinity of the pressure detection unit 200 to cool the pressure detection unit 200. In another embodiment, for example, the cooling unit 210 and the pressure detection unit 200 may be in contact with each other via the heat reducing unit 195, or may be in direct contact with each other. In addition, a plurality of cooling units 210 may be provided.

The injection molding machine 10c of the third embodiment described above also improves the injection accuracy of the plasticized material and improves the molding accuracy of the molded product. In particular, in the present embodiment, the cooling unit 210 cools the pressure detection unit 200. Therefore, deterioration of the pressure detection unit 200 due to heat is prevented, and detection accuracy of the pressure by the pressure detection unit 200 is improved.

D. Fourth Embodiment

Figure 13:
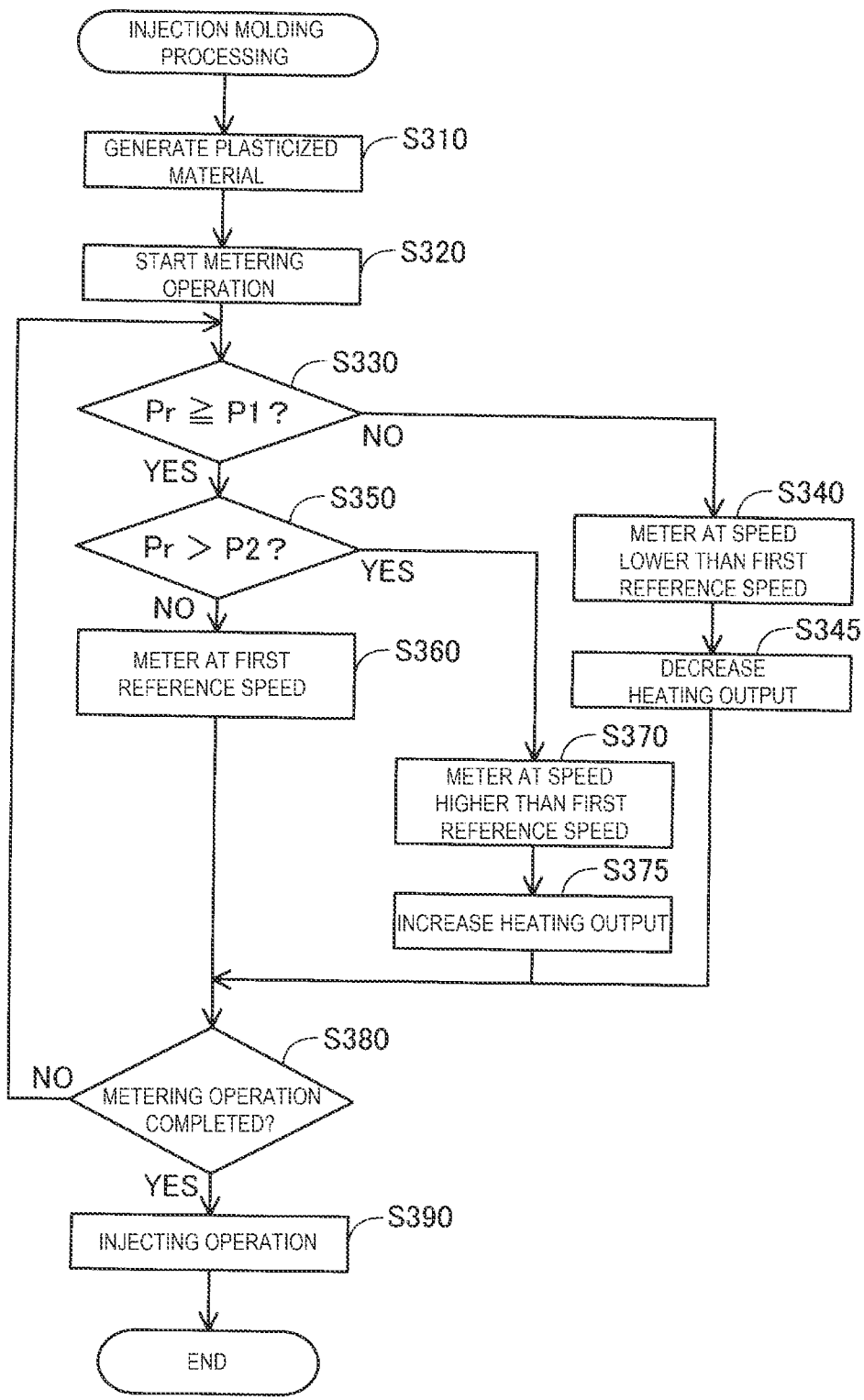
FIG. 13 is a flowchart showing an injection molding processing according to a fourth embodiment.

FIG. 13 is a flowchart showing an injection molding processing according to a fourth embodiment. It can be said that FIG. 13 shows an example of a method of controlling the injection molding machine 10 according to the fourth embodiment. In the injection molding processing according to the fourth embodiment, similar to the first embodiment, the metering operation is executed based on the detected value Pr. On the other hand, in the injection molding processing of the fourth embodiment, unlike the first embodiment, the heating unit 148 is controlled based on the detected value Pr in the metering operation. Since the configuration of the injection molding machine 10 of the fourth embodiment is similar to that of the first embodiment, a description thereof is omitted.

Since steps S310 to S340 are similar to steps S110 to S140 of the first embodiment shown in FIG. 6, and a description thereof is omitted.

In step S345, the control unit 500 controls the heating unit 148 to decrease the output of the heating unit 148. That is, in the present embodiment, the control unit 500 decreases the output of the heating unit 148 when the detected value Pr is less than the first reference value P1 at, for example, the time t1 shown in FIG. 8. Accordingly, the viscosity of the plasticized material flowing into the communication hole 146 is improved and the detected value Pr increases after the time t1 compared with a case where the output of the heating unit 148 is not decreased.

Since steps S350 to S370 are similar to steps S150 to S170 of the first embodiment shown in FIG. 6, and a description thereof is omitted.

In step S375, the control unit 500 controls the heating unit 148 to increase the output of the heating unit 148. That is, in the present embodiment, the control unit 500 increases the output of the heating unit 148 when the detected value Pr is greater than the second reference value P2 at, for example, the time t2 shown in FIG. 8. Accordingly, the viscosity of the plasticized material flowing into the communication hole 146 is decreased and the detected value Pr decreases after the time t2 compared with a case where the output of the heating unit 148 is not increased.

Since steps S380 and S390 are similar to steps S180 and S190 of the first embodiment shown in FIG. 6, and a description thereof is omitted.

When the injecting operation is executed based on the detected value Pr as in the second embodiment, the control unit 500 may control the heating unit 148 based on the detected value Pr in the injecting operation. In this case, for example, the control unit 500 may decrease the output of the heating unit 148 when the detected value Pr is not equal to or greater than the third reference value P3, and increase the output of the heating unit 148 when the detected value Pr is greater than the fourth reference value P4. The control unit 500 may control the heating unit 148 based on the detected value Pr using, for example, a value other than the first reference value P1 to the fourth reference value P4 as the reference value.

The injection molding machine 10 of the fourth embodiment described above also improves the injection accuracy of the plasticized material and improves the molding accuracy of the molded product. In particular, in the present embodiment, the heating unit 148 is controlled based on the detected value Pr. Therefore, a plasticized state of the plasticized material generated by the melting unit 120 is stabilized, thereby improving the molding accuracy.

A heater for heating the plasticized material in the cylinder 151 may be provided in the cylinder 151. In this case, for example, a heater may be disposed so as to be in contact with a side surface of the cylinder 151. The control unit 500 may control the heater based on the detected value Pr in the metering operation or the injecting operation. In this case, the plasticized state of the plasticized material in the cylinder 151 is stabilized.

E. Fifth Embodiment

Figure 14:
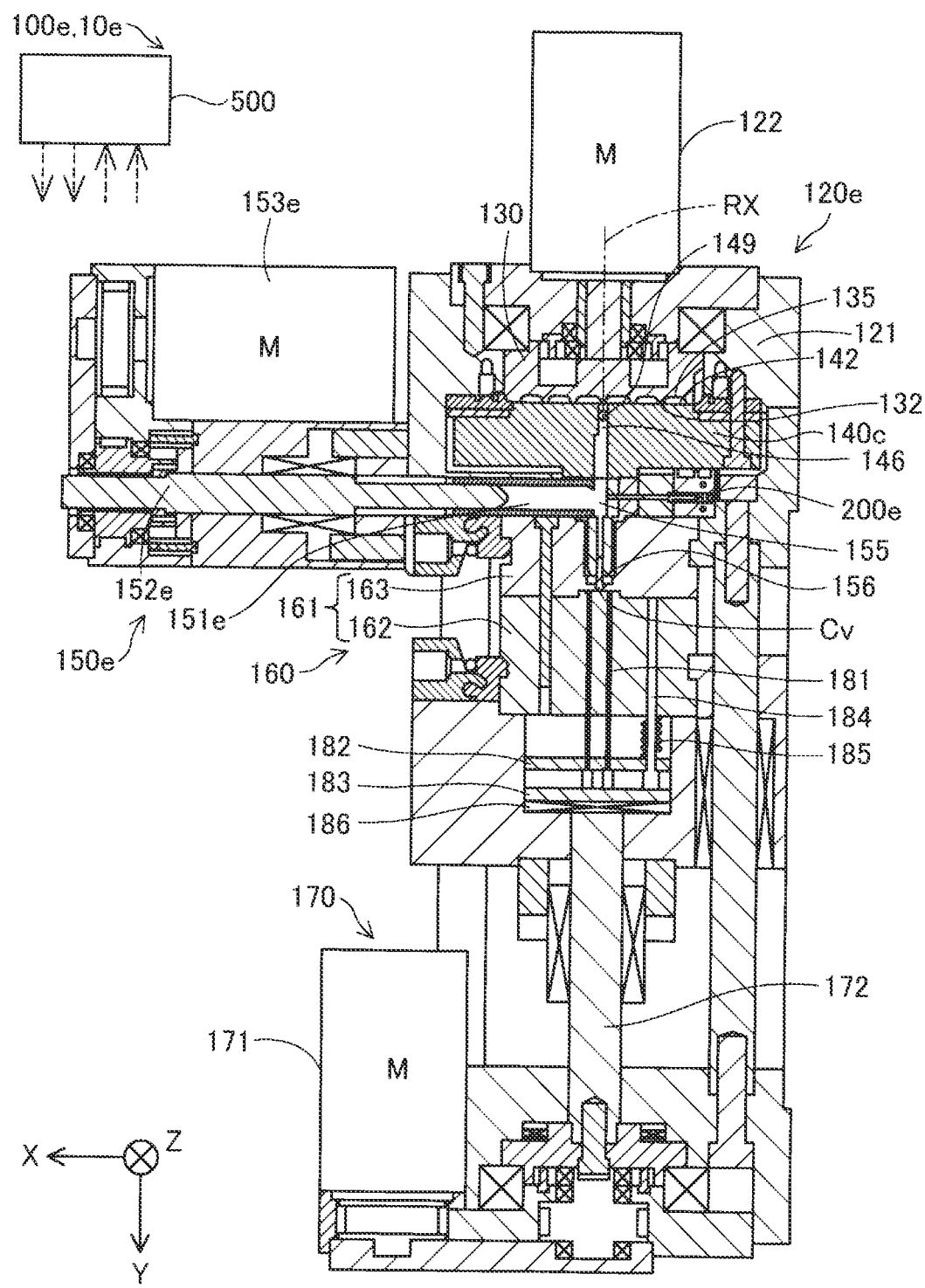
FIG. 14 is a diagram showing a schematic configuration of an injection molding machine according to a fifth embodiment.

FIG. 14 is a diagram showing a schematic configuration of an injection molding machine 10e according to a fifth embodiment. In the present embodiment, a configuration of an injection unit 100e is different from that of the first embodiment. Points of the injection unit 100e that are not particularly described are similar to those of the first embodiment.

The injection unit 100e of the present embodiment has a supply flow path 155. The supply flow path 155 is formed as a flow path that allows the communication hole 146 and the injection nozzle 156 to communicate with each other outside a barrel 140e. One end of the supply flow path 155 communicates with the communication hole 146 of the barrel 140e. The other end of the supply flow path 155 communicates with the injection nozzle 156. The plasticized material generated by the melting unit 120e flows into the injection nozzle 156 via the communication hole 146 and the supply flow path 155.

Similar to the first embodiment, an injection control unit 150e of the present embodiment includes a cylinder 151e, a plunger 152e, and a plunger drive unit 153e. As shown in FIG. 14, the cylinder 151e of the present embodiment is coupled to the supply flow path 155 instead of being coupled to the communication hole 146. The plunger 152e moves inside the cylinder 151e. The plunger 152e is driven by the plunger drive unit 153e implemented by a motor, a gear, or the like. The plunger drive unit 153e is controlled by the control unit 500.

Similar to the first embodiment, the injection control unit 150e performs the metering operation and the injecting operation by sliding the plunger 152e in the cylinder 151e under the control of the control unit 500. In the present embodiment, the metering operation refers to an operation of guiding the plasticized material in the supply flow path 155 into the cylinder 151 to be metered in the cylinder 151 by moving the plunger 152 in the −X direction away from the communication hole 155. The injecting operation refers to an operation of injecting the plasticized material in the cylinder 151 into the mold via the injection nozzle 156 by moving the plunger 152 in the +X direction approaching the supply flow path 155.

Figure 15:
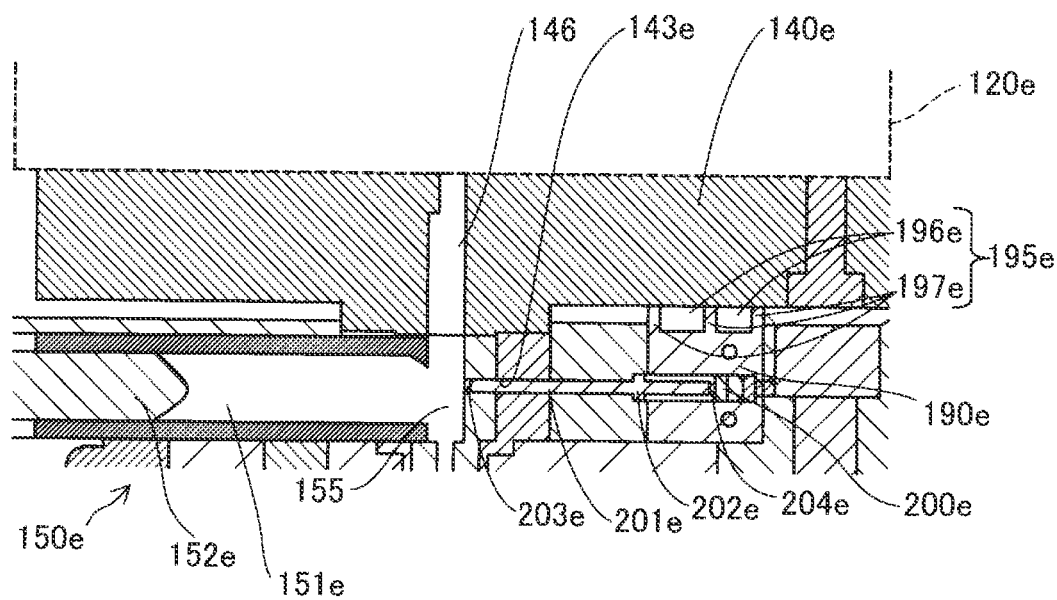
FIG. 15 is a diagram showing a schematic configuration of a pressure detection unit according to the fifth embodiment.
Figure 15:
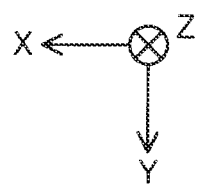

FIG. 15 is a diagram showing a schematic configuration of a pressure detection unit 200e. The pressure detection unit 200e, unlike the first embodiment, detects a pressure of the plasticized material in the supply flow path 155 instead of the communication hole 146.

The pressure detection unit 200e is supported by a support unit 190e. In the present embodiment, the support unit 190e is disposed at a position different from that in the first embodiment. Specifically, in the present embodiment, the concave portion 191 is not provided in the barrel 140e of the melting unit 120e, and the support unit 190e is provided in contact with a lower portion of the barrel 140e.

Similar to the first embodiment, the support unit 190e includes a heat reducing unit 195e. The heat reducing unit 195e is provided between the pressure detection unit 200e and the melting unit 120e. The heat reducing unit 195e has a plurality of leg portions 196e. A plurality of spaces 197e are formed between the melting unit 120e and the support unit 190e by the plurality of leg portions 196e. Due to the air in the space 197e, the heat conduction from the melting unit 120e to the pressure detection unit 200e is reduced by the heat reducing unit 195e.

The pressure detection unit 200e according to the present embodiment detects a pressure of the plasticized material in the supply flow path 155 via a rod 201e. The rod 201e is an axial member having a flange portion 202e. The rod 201e is disposed in a through hole 143e in communication with the supply flow path 155 along the X direction. The through hole 143e is provided along the X direction. A tip end portion 203e, which is one end of the rod 201e, is disposed so as to face an inside of the supply flow path 155. A rear end portion 204e, which is the other end of the rod 201e, is provided to face the pressure detection unit 200e. The flange portion 202e is formed in the middle of the rod 201e in the X direction. The flange portion 202e is disposed in the −X direction of the through hole 143e so as to restrict the movement of the rod 201e in the +X direction.

The rod 201e receives a pressure of the plasticized material in the supply flow path 155 by the tip end portion 203e, and transfers the received pressure to the pressure detection unit 200e by the rear end portion 204e. The pressure detection unit 200e detects the pressure transferred from the rod 201e. Similar to the first embodiment, the pressure detection unit 200 according to the present embodiment is implemented by a pressure sensor having quartz.

In the present embodiment, the control unit 500 executes a similar injection molding processing to the injection molding processing of the first embodiment shown in FIG. 6. That is, the control unit 500 controls the injection control unit 150e to execute the metering operation based on the detected value Pr by the pressure detection unit 200e.

Figure 16:
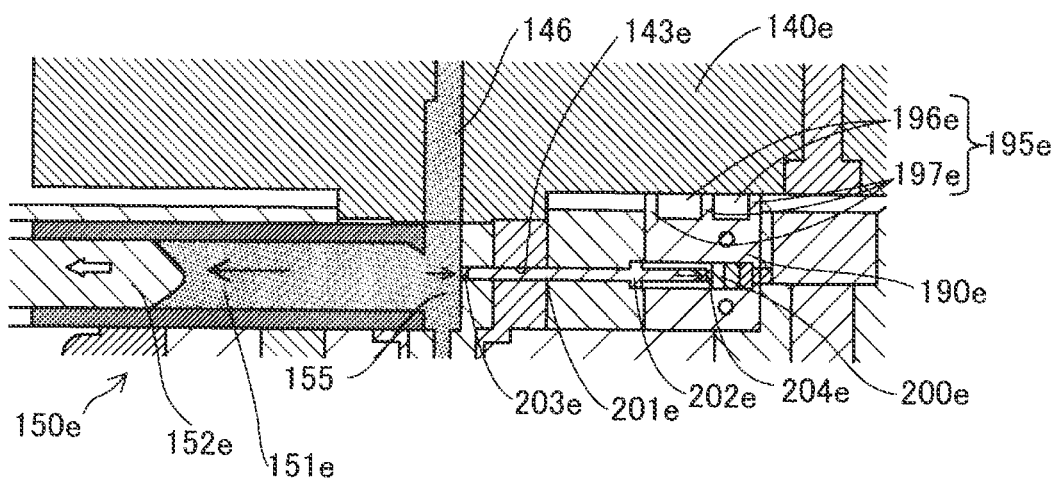
FIG. 16 is a diagram showing a metering operation according to the fifth embodiment.
Figure 16:
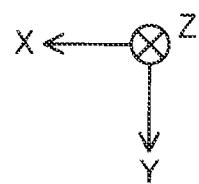

FIG. 16 is a diagram showing the metering operation according to the present embodiment. In the metering operation, when the plunger 152e is pulled, the inside of the supply flow path 155 is filled with the plasticized material, and the plasticized material is guided into the cylinder 151e. The pressure detection unit 200e detects the pressure of the plasticized material in the supply flow path 155 during the metering operation.

According to the injection molding machine 10e of the present embodiment described above, the control unit 500 controls, based on the detected value Pr detected by the pressure detection unit 200e, the injection control unit 150e to execute the metering operation. Accordingly, even when the amount or state of the plasticized material generated by the melting unit 120e is changed, the metering accuracy is kept high. Therefore, the injection accuracy of the plasticized material is improved, and the molding accuracy of the molded product is improved.

Figure 17:
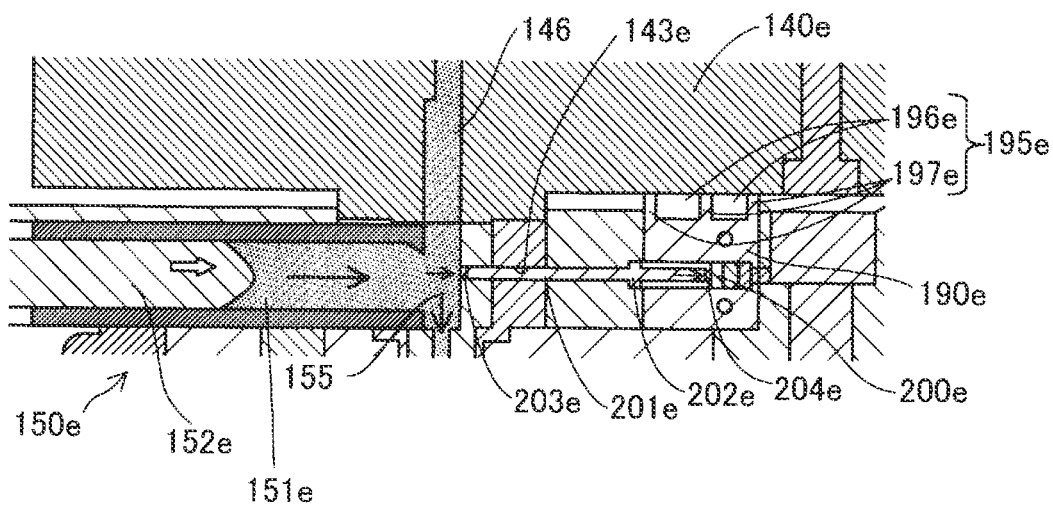
FIG. 17 is a diagram showing an injecting operation according to the fifth embodiment.
Figure 17:
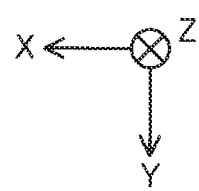

Similar to the injection molding processing of the second embodiment shown in FIG. 9, the control unit 500 may control the injection control unit 150e based on the detected value Pr to execute the injecting operation. FIG. 17 is a diagram showing the injecting operation according to the present embodiment. After the metering operation, when the plunger 152 is pushed, the plasticized material in the cylinder 151 is sent to the injection nozzle 156 via the communication hole 146 and the supply flow path 155, and is injected into the cavity Cv of the mold unit 160 via the injection nozzle 156. The pressure detection unit 200e can also detect the pressure of the plasticized material in the supply flow path 155 during the injecting operation. Also in this case, the injection accuracy of the plasticized material is improved, and the molding accuracy of the molded product is improved.

Similar to the injection molding processing in the fourth embodiment shown in FIG. 13, the control unit 500 may control the heating unit 148 based on the detected value Pr in the metering operation. In the injecting operation, the heating unit 148 may be controlled based on the detected value Pr. Also in this case, the injection accuracy of the plasticized material is improved, and the molding accuracy of the molded product is improved.

F. Sixth Embodiment

Figure 18:
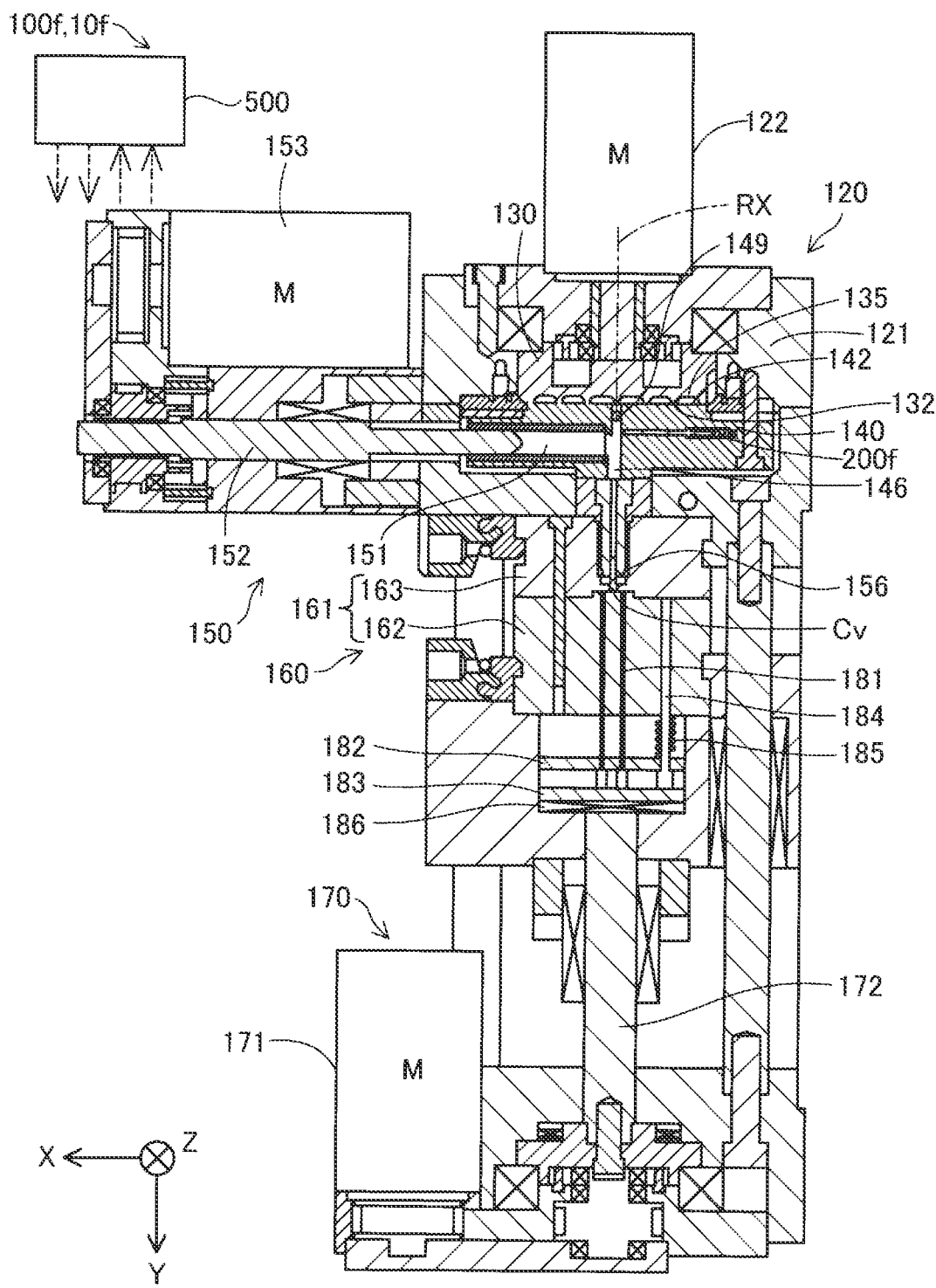
FIG. 18 is a diagram showing a schematic configuration of an injection molding machine according to a sixth embodiment.

FIG. 18 is a diagram showing a schematic configuration of an injection molding machine 10f according to a sixth embodiment. In the present embodiment, a configuration of a pressure detection unit 200f of an injection unit 100f is different from that of the first embodiment. Points of the injection unit 100f that are not particularly described are similar as those of the first embodiment.

In the present embodiment, unlike the first embodiment, the pressure detection unit 200f detects the pressure of the plasticized material in the communication hole 146 upstream of a coupling portion between the cylinder 151 and the communication hole 146. Specifically, the pressure detection unit 200f detects the pressure of the plasticized material via the rod 201 disposed downstream of the check valve 149 and upstream of the coupling portion between the cylinder 151 and the communication hole 146. The injection unit 100f of the present embodiment does not include the support unit 190. The pressure detection unit 200f is fixed to the barrel 140 by a fixing portion (not shown).

The injection molding machine 10f of the sixth embodiment described above also improves the injection accuracy of the plasticized material and improves the molding accuracy of the molded product. In particular, in the present embodiment, the pressure detection unit 200f detects the pressure of the plasticized material in the communication hole 146 upstream of the coupling portion between the cylinder 151 and the communication hole 146. Accordingly, the injection control unit 150 is controlled based on the detected value of the pressure of the plasticized material at a position closer to the melting unit 120 in the metering operation or the injecting operation. Therefore, interlocking between the injection control unit 150 and the melting unit 120 is improved.

G. Other Embodiments (G-1) In the above embodiment, the control unit 500 adjusts the pulling speed of the plunger 152 based on the detected value Pr in the metering operation. In contrast, for example, the control unit 500 may adjust a pulling amount of the plunger 152 based on the detected value Pr in the metering operation. Specifically, the position of the plunger 152 at the completion of the metering operation may be controlled based on the detected value Pr.

(G-2) In the above embodiment, in the metering operation, the control unit 500 pulls the plunger 152 at the first reference speed when the detected value Pr is equal to or greater than the first reference value P1 and equal to or less than the second reference value P2, pulls the plunger 152 at a speed lower than the first reference speed when the detected value Pr is less than the first reference value P1, and pulls the plunger 152 at a speed higher than the first reference speed when the detected value Pr is greater than the second reference value P2. In contrast, for example, the control unit 500 may determine whether the detected value Pr is equal to or greater than one reference value, and control the injection control unit 150 according to a determination result.

(G-3) In the above embodiment, the control unit 500 adjusts the pushing speed of the plunger 152 based on the detected value Pr in the injecting operation. In contrast, for example, the control unit 500 may adjust a position at which the plunger 152 starts to be pushed based on the detected value Pr in the injecting operation.

(G-4) In the above embodiment, in the injecting operation, the control unit 500 pushes the plunger 152 at the second reference speed when the detected value Pr is equal to or greater than the third reference value P3 and equal to or less than the fourth reference value P4, pushes the plunger 152 at a speed higher than the second reference speed when the detected value Pr is less than the third reference value P3, and pushes the plunger 152 at a speed lower than the second reference speed when the detected value Pr is greater than the fourth reference value P4. In contrast, for example, the control unit 500 may determine whether the detected value Pr is equal to or greater than one reference value, and control the injection control unit 150 according to a determination result.

(G-5) In the above embodiment, the heat reducing unit 195 is provided between the pressure detection unit 200 and the melting unit 120. In contrast, the heat reducing unit 195 may not be provided between the pressure detection unit 200 and the melting unit 120.

(G-6) In the above embodiment, the screw 130 includes the retention reducing portion 138 in the central portion 137. In contrast, the screw 130 may not have the retention reducing portion 138.

(G-7) In the above embodiment, the pressure detection unit 200 detects the pressure of the plasticized material via the rod 201. In contrast, the pressure detection unit 200 may detect the pressure of the plasticized material without using the rod 201.

(G-8) In the above embodiment, the pressure detection unit 200 detects the pressure of the plasticized material in the entire process of the injection molding processing. In contrast, the pressure detection unit 200 may detect the pressure of the plasticized material only in a part of the process of the injection molding processing. For example, the pressure detection unit 200 may detect the pressure during the metering operation or the injecting operation, and may not detect the pressure in other processes.

H. Other Aspects

The present disclosure is not limited to the embodiments described above, and may be implemented by various aspects without departing from the scope of the present disclosure. For example, the present disclosure can be implemented in the following aspects. In order to solve some or all of problems of the present disclosure, or to achieve some or all of effects of the present disclosure, technical characteristics in the above-described embodiments corresponding to technical characteristics in aspects described below can be replaced or combined as appropriate. The technical features can be deleted as appropriate unless the technical features are described as essential in the present description.

(1) According to a first aspect of the present disclosure, an injection molding machine is provided. The injection molding machine includes: a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole; a heating unit configured to heat the melting unit; an injection nozzle in communication with the communication hole; an injection control unit including a cylinder coupled to the communication hole and a plunger configured to move in the cylinder; a pressure detection unit configured to detect a pressure of the plasticized material in the communication hole; and a control unit. The control unit controls the injection control unit to execute, based on a detected value detected by the pressure detection unit, at least one of a metering operation of metering the plasticized material in the communication hole in the cylinder by moving the plunger in a direction away from the communication hole, and an injecting operation of injecting the plasticized material in the cylinder into a mold via the injection nozzle by moving the plunger in a direction approaching the communication hole.

According to such an aspect, even when the amount or state of the plasticized material generated by the melting unit is changed, the injection accuracy of the plasticized material is kept high. Therefore, the molding accuracy of the molded product is improved.

(2) In the injection molding machine according to the above aspect, in the metering operation, the control unit may adjust a speed of moving the plunger in the direction away from the communication hole based on the detected value. According to such an aspect, the metering accuracy of the plasticized material is kept high, and the injection accuracy of the plasticized material is improved.

(3) In the injection molding machine according to the above aspect, the control unit may move the plunger at a first reference speed when the detected value is equal to or greater than a first reference value and equal to or less than a second reference value larger than the first reference value, move the plunger at a speed lower than the first reference speed when the detected value is less than the first reference value, and move the plunger at a speed higher than the first reference speed when the detected value is greater than the second reference value. According to such an aspect, the metering accuracy of the plasticized material is kept high, and the plasticized material is efficiently metered.

(4) In the injection molding machine according to the above aspect, in the injecting operation, the control unit may adjust a speed of moving the plunger in the direction approaching the communication hole based on the detected value. According to such an aspect, the injection accuracy of the plasticized material is improved.

(5) In the injection molding machine according to the above aspect, the control unit may move the plunger at a second reference speed when the detected value is equal to or greater than a third reference value and equal to or less than a fourth reference value larger than the third reference value, move the plunger at a speed higher than the second reference speed when the detected value is less than the third reference value, and move the plunger at a speed lower than the second reference speed when the detected value is greater than the fourth reference value. According to such an aspect, the injection accuracy of the plasticized material is kept high, and the molded product is efficiently molded.

(6) In the injection molding machine according to the above aspect, a heat reducing unit may be provided between the pressure detection unit and the melting unit to reduce heat conduction from the melting unit to the pressure detection unit. According to such an aspect, deterioration of the pressure detection unit due to heat transfer from the melting unit is prevented, and a degree of freedom of an arrangement place of the pressure detection unit is increased.

(7) In the injection molding machine according to the above aspect, a cooling unit configured to cool a region of the melting unit closer to an outer peripheral portion of the barrel than the communication hole in a direction along the groove forming surface may be included, and the cooling unit may cool the pressure detection unit. According to such an aspect, deterioration of the pressure detection unit due to heat is prevented, and detection accuracy of the pressure by the pressure detection unit is improved.

(8) In the injection molding machine according to the above aspect, the pressure detection unit may detect a pressure of the plasticized material in the communication hole downstream of a coupling portion between the cylinder and the communication hole. According to such an aspect, the injection control unit is controlled based on the detected value of the pressure of the plasticized material at a position closer to the injection nozzle in the metering operation and the injecting operation. Therefore, the amount or the pressure of the injected plasticized material is more stable and the injection accuracy of the plasticized material is improved.

(9) In the injection molding machine according to the above aspect, the screw may include a retention reducing portion protruding toward the communication hole in a central portion of the groove forming surface. According to such an aspect, the amount or state of the plasticized material sent from the melting unit to the injection nozzle via the communication hole is stabilized, and the injection accuracy of the plasticized material is improved.

(10) In the injection molding machine according to the above aspect, the control unit may control the heating unit based on the detected value. According to such an aspect, the heating unit is controlled based on the detected value. Therefore, the plasticized state of the plasticized material is stabilized, thereby improving the molding accuracy of the molded product.

(11) According to a second aspect of the present disclosure, an injection molding machine is provided. The injection molding machine includes: a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole; a supply flow path in communication with the communication hole; a heating unit configured to heat the melting unit; an injection nozzle in communication with the supply flow path; an injection control unit including a cylinder coupled to the supply flow path and a plunger configured to move in the cylinder; a pressure detection unit configured to detect a pressure of the plasticized material in the supply flow path; and a control unit. The control unit controls the injection control unit to execute, based on a detected value detected by the pressure detection unit, at least one of a metering operation of metering the plasticized material in the supply flow path in the cylinder by moving the plunger in a direction away from the supply flow path, and an injecting operation of injecting the plasticized material in the cylinder into a mold via the injection nozzle by moving the plunger in a direction approaching the supply flow path.

According to such an aspect, even when the amount or state of the plasticized material generated by the melting unit is changed, the injection accuracy of the plasticized material is kept high. Therefore, the molding accuracy of the molded product is improved.

(12) According to a third aspect of the present disclosure, a method of controlling an injection molding machine is provided. In the method of controlling an injection molding machine, the injection molding machine includes: a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole; a heating unit configured to heat the melting unit; an injection nozzle in communication with the communication hole; and an injection control unit including a cylinder coupled to the communication hole and a plunger configured to move in the cylinder. The method of controlling an injection molding machine includes: detecting a pressure of the plasticized material in the communication hole; and controlling the injection control unit to execute, based on a detected value of the detected pressure, at least one of a metering operation of metering the plasticized material in the communication hole into the cylinder by moving the plunger in a direction away from the communication hole, and an injecting operation of injecting the plasticized material in the cylinder via the injection nozzle by moving the plunger in a direction approaching the communication hole.

According to such an aspect, even when the amount or state of the plasticized material generated by the melting unit is changed, the injection accuracy of the plasticized material is kept high. Therefore, the molding accuracy of the molded product is improved.

The present disclosure is not limited to the injection molding machine or the method of controlling an injection molding machine described above, but can be implemented in various modes. For example, the present disclosure can be implemented in the form of a method of manufacturing a molded object.

What is claimed is:

1. An injection molding machine comprising:
   a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole, wherein
      the screw includes a retention reducing portion that protrudes toward the communication hole, and
      the retention reducing portion is at a central portion of the groove forming surface;
   a curved projection strip is formed on the groove forming surface,
   a portion of the curved projection strip extends, as a continuous structure, from a peripheral edge of the central portion to an outer periphery of the screw, wherein
      the communication hole is at a position on the facing surface facing the central portion of the groove forming surface,
      the retention reducing portion protrudes from the central portion toward the communication hole, and
      the central portion of the groove forming surface providing a groove portion encircling the retention reducing portion to space a terminal end of the portion of the curved projection strip from the retention reducing portion;
   a heating unit configured to heat the melting unit;
   an injection nozzle in communication with the communication hole;
   an injection control unit including a cylinder coupled to the communication hole and a plunger configured to move in the cylinder;
   a pressure detection unit configured to detect a pressure of the plasticized material in the communication hole; and
   a control unit, wherein
      the control unit controls the injection control unit to execute, based on a value of the detected pressure, at least one of
      a metering operation of metering the plasticized material in the communication hole in the cylinder by moving the plunger in a direction away from the communication hole, and
      an injecting operation of injecting the plasticized material in the cylinder into a mold via the injection nozzle by moving the plunger in a direction approaching the communication hole.

2. The injection molding machine according to claim 1, wherein
   in the metering operation, the control unit adjusts a speed of moving the plunger in the direction away from the communication hole based on the value.

3. The injection molding machine according to claim 2, wherein
   the control unit moves the plunger at a first reference speed when the value is equal to or greater than a first reference value and equal to or less than a second reference value larger than the first reference value, moves the plunger at a speed lower than the first reference speed when the value is less than the first reference value, and moves the plunger at a speed higher than the first reference speed when the value is greater than the second reference value.

4. The injection molding machine according to claim 1, wherein
   in the injecting operation, the control unit adjusts a speed of moving the plunger in the direction approaching the communication hole based on the value.

5. The injection molding machine according to claim 4, wherein
   the control unit moves the plunger at a second reference speed when the value is equal to or greater than a third reference value and equal to or less than a fourth reference value larger than the third reference value, moves the plunger at a speed higher than the second reference speed when the value is less than the third reference value, and moves the plunger at a speed lower than the second reference speed when the value is greater than the fourth reference value.

6. The injection molding machine according to claim 1, wherein
   a heat reducing unit is provided between the pressure detection unit and the melting unit to reduce heat conduction from the melting unit to the pressure detection unit.

7. The injection molding machine according to claim 1, further comprising:
a cooling unit configured to cool a region of the melting unit closer to an outer peripheral portion of the barrel than the communication hole in a direction along the groove forming surface, wherein
the cooling unit cools the pressure detection unit.

8. The injection molding machine according to claim 1, wherein
the pressure detection unit detects a pressure of the plasticized material in the communication hole downstream of a coupling portion between the cylinder and the communication hole.

9. The injection molding machine according to claim 1, wherein
the control unit executes at least one of the metering operation and the injecting operation based on the value, and controls the heating unit based on the value.

10. A method of controlling an injection molding machine,
the injection molding machine including
a melting unit including a screw rotating about a rotation axis and having a groove forming surface on which a groove is formed and a barrel having a facing surface facing the groove forming surface and provided with a communication hole in the facing surface, and configured to plasticize a material supplied between the screw and the barrel to generate a plasticized material and make the plasticized material flow out of the communication hole, wherein
the screw includes a retention reducing portion that protrudes toward the communication hole, and
the retention reducing portion is at a central portion of the groove forming surface;
a curved projection strip is formed on the groove forming surface, a portion of the curved projection strip extends, as a continuous structure, from a peripheral edge of the central portion to an outer periphery of the screw, wherein
the communication hole is at a position on the facing surface facing the central portion of the groove forming surface,
the retention reducing portion protrudes from the central portion toward the communication hole, and
the central portion of the groove forming surface providing a groove portion encircling the retention reducing portion to space a terminal end of the portion of the curved projection strip from the retention reducing portion;
a heating unit configured to heat the melting unit;
an injection nozzle in communication with the communication hole; and
an injection control unit including a cylinder coupled to the communication hole and a plunger configured to move in the cylinder,
the method of controlling an injection molding machine comprising:
detecting a pressure of the plasticized material in the communication hole; and
controlling the injection control unit to execute, based on a value of the detected pressure, at least one of
a metering operation of metering the plasticized material in the communication hole in the cylinder by moving the plunger in a direction away from the communication hole, and
an injecting operation of injecting the plasticized material in the cylinder via the injection nozzle by moving the plunger in a direction approaching the communication hole.

11. The injection molding machine according to claim 1, wherein
the retention reducing portion protrudes from the central portion toward the communication hole, and
a tip of the retention reducing portion is inside the communication hole.

12. The injection molding machine according to claim 1, wherein the pressure detection unit includes a rod inserted into a through hole which is coupled to the communication hole and a pressure sensor disposed apart from the communication hole via the rod, and the rod has a first end surface facing the communication hole and a second end surface opposite to the first end surface in a longitudinal direction of the rod, and configured to receive a pressure of the plasticized material in the communication hole at the first end surface and transmit the pressure to the pressure sensor through the second end surface.

13. The injection molding machine according to claim 12, wherein the rod has a flange portion midway in the longitudinal direction of the rod, and the flange portion is disposed on rear side of the through hole located away from the communication hole so as to restrict a movement of the rod in a direction toward the communication hole.

* * * * *